(12) United States Patent
Wong et al.

(10) Patent No.: US 9,009,104 B2
(45) Date of Patent: Apr. 14, 2015

(54) CHECKPOINT-FREE IN LOG MINING FOR DISTRIBUTED INFORMATION SHARING

(75) Inventors: Lik Wong, Union City, CA (US); Nimar S. Arora, Union City, CA (US); Cristina Schmidt, Santa Clara, CA (US); Lei Gao, Foster City, CA (US); Thuyan Hoang, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/853,991

(22) Filed: Aug. 10, 2010

(65) Prior Publication Data
US 2011/0010392 A1 Jan. 13, 2011

Related U.S. Application Data

(62) Division of application No. 11/831,447, filed on Jul. 31, 2007, now Pat. No. 7,801,852.

(51) Int. Cl.
*G06F 17/30* (2006.01)

(52) U.S. Cl.
CPC .............................. *G06F 17/30368* (2013.01)

(58) Field of Classification Search
CPC ................... G06F 17/30289; G06F 17/30371; G06F 17/30368
USPC ........................ 707/610, E17.014, 999.2, 776
See application file for complete search history.

(56) References Cited

U.S. PATENT DOCUMENTS

| 5,235,700 | A | 8/1993 | Alaiwan et al. |
| 5,418,913 | A | 5/1995 | Fujimoto |
| 5,504,899 | A | 4/1996 | Raz |
| 5,701,480 | A | 12/1997 | Raz |
| 5,721,914 | A | 2/1998 | DeVries |
| 5,806,076 | A | 9/1998 | Ngai et al. |
| 5,859,992 | A | 1/1999 | Tran et al. |
| 5,870,761 | A | 2/1999 | Demers et al. |
| 5,881,216 | A | 3/1999 | Johnson |
| 5,941,975 | A | 8/1999 | Park et al. |
| 5,991,771 | A * | 11/1999 | Falls et al. ............................. 1/1 |
| 6,029,178 | A * | 2/2000 | Martin et al. ......................... 1/1 |
| 6,029,217 | A | 2/2000 | Arimilli et al. |
| 6,169,988 | B1 | 1/2001 | Asakura |
| 6,173,373 | B1 | 1/2001 | Bonola |
| 6,178,472 | B1 | 1/2001 | Carpenter et al. |

(Continued)

FOREIGN PATENT DOCUMENTS

WO     WO 0133349 A2     5/2001

OTHER PUBLICATIONS

IBM, "Replication Guide and Reference", 2000, IBM, Version 7, pp. i-xx, 8-9, 46, 54-55, 142-143.

(Continued)

*Primary Examiner* — Shiow-Jy Fan
(74) *Attorney, Agent, or Firm* — Hickman Palermo Truong Becker Bingham Wong LLP

(57) ABSTRACT

Techniques for replicating data between database systems without taking checkpoints are provided. In an embodiment, a capture process restarts. Upon restarting, the capture process reestablishes an association with an apply process. A particular logical time maintained by the apply process is then communicated to the capture process. Upon receiving the particular logical time, the capture process restarts mining from this particular logical time.

20 Claims, 15 Drawing Sheets

(56) References Cited

U.S. PATENT DOCUMENTS

| | | |
|---|---|---|
| 6,272,500 B1 | 8/2001 | Sugita |
| 6,289,343 B1 | 9/2001 | Freund et al. |
| 6,363,421 B2 | 3/2002 | Barker et al. |
| 6,374,264 B1 | 4/2002 | Bohannon et al. |
| 6,430,191 B1 | 8/2002 | Klausmeier et al. |
| 6,430,577 B1 * | 8/2002 | Hart ........... 1/1 |
| 6,553,419 B1 | 4/2003 | Ram |
| 6,584,477 B1 | 6/2003 | Mosher |
| 6,658,596 B1 | 12/2003 | Owen et al. |
| 6,662,213 B1 | 12/2003 | Xie et al. |
| 6,751,573 B1 | 6/2004 | Burch |
| 6,804,672 B1 * | 10/2004 | Klein et al. ........... 1/1 |
| 6,874,104 B1 | 3/2005 | Josten et al. |
| 6,889,231 B1 | 5/2005 | Souder et al. |
| 6,907,479 B2 | 6/2005 | Karnestedt et al. |
| 6,980,988 B1 | 12/2005 | Demers et al. |
| 7,010,529 B2 | 3/2006 | Klein et al. |
| 7,031,974 B1 | 4/2006 | Subramaniam |
| 7,035,852 B2 | 4/2006 | Hopewell et al. |
| 7,124,110 B1 | 10/2006 | Kemp et al. |
| 7,130,936 B1 | 10/2006 | Baines et al. |
| 7,219,198 B2 | 5/2007 | Sivaram et al. |
| 7,257,687 B2 | 8/2007 | Au et al. |
| 7,392,265 B2 | 6/2008 | Kraft et al. |
| 7,412,572 B1 | 8/2008 | Shavit et al. |
| 7,526,583 B2 | 4/2009 | Mack et al. |
| 7,529,886 B2 | 5/2009 | Emmes et al. |
| 7,533,221 B1 | 5/2009 | Doherty et al. |
| 7,668,878 B2 | 2/2010 | Arora et al. |
| 7,769,714 B2 | 8/2010 | Lu et al. |
| 7,779,418 B2 | 8/2010 | Surlaker et al. |
| 7,783,601 B2 | 8/2010 | Wong et al. |
| 7,801,852 B2 | 9/2010 | Wong et al. |
| 7,856,420 B2 | 12/2010 | Zargham et al. |
| 2001/0047270 A1 | 11/2001 | Gusick et al. |
| 2002/0059165 A1 | 5/2002 | Hersh et al. |
| 2002/0112009 A1 | 8/2002 | Capers et al. |
| 2002/0144006 A1 | 10/2002 | Cranston et al. |
| 2003/0115276 A1 | 6/2003 | Flaherty et al. |
| 2003/0133214 A1 | 7/2003 | Miller et al. |
| 2003/0236834 A1 | 12/2003 | Gottfried |
| 2005/0120355 A1 | 6/2005 | Kraft et al. |
| 2006/0004876 A1 * | 1/2006 | Matsunami et al. .......... 707/200 |
| 2006/0080394 A1 | 4/2006 | Goodman et al. |
| 2006/0167960 A1 | 7/2006 | Lomet |
| 2006/0187836 A1 | 8/2006 | Frey et al. |
| 2007/0053359 A1 * | 3/2007 | Wu et al. ............. 370/392 |
| 2007/0083569 A1 | 4/2007 | Wong et al. |
| 2007/0198788 A1 | 8/2007 | Hsien et al. |
| 2008/0005189 A1 | 1/2008 | Omura |
| 2008/0027987 A1 | 1/2008 | Arora et al. |
| 2008/0228833 A1 * | 9/2008 | Kano ............. 707/202 |
| 2009/0037494 A1 | 2/2009 | Wong et al. |
| 2009/0141629 A1 | 6/2009 | Gerosa et al. |
| 2009/0249356 A1 | 10/2009 | He et al. |
| 2010/0198920 A1 | 8/2010 | Wong et al. |
| 2011/0010392 A1 | 1/2011 | Wong et al. |
| 2012/0109910 A1 | 5/2012 | Netz et al. |

OTHER PUBLICATIONS

Holzher, Steve, "Design Patterns for Dummies", May 8, 2006, John Wiley & Sons, pp. 2-7.

David Lomet, "Using Timestamping to Optimize Two Phase Commit", Jan 1993, IEEE, Proceedings of the $2^{nd}$ International Conference on Parallel and Distributed Information Systems, pp. 48-55.

Canadian Patent Office, CA Office Action received in International Application No. 2,665,951 dated Feb. 24, 2012 (4 pages).

Current Claims, Application No. 2,665,951, Feb. 2012 (5 pages).

Oliver Gunther, et al., "MMM: A Web-Based System for Sharing Statistical Computing Modules," IEEE, May-Jun. 1997, vol. 1, Issue 3, 10 pages.

Canadian Intellectual Property Office ,"Notice of Allowance" in application No. 2,665,951, dated Aug. 23, 2012, 1 pages.

* cited by examiner

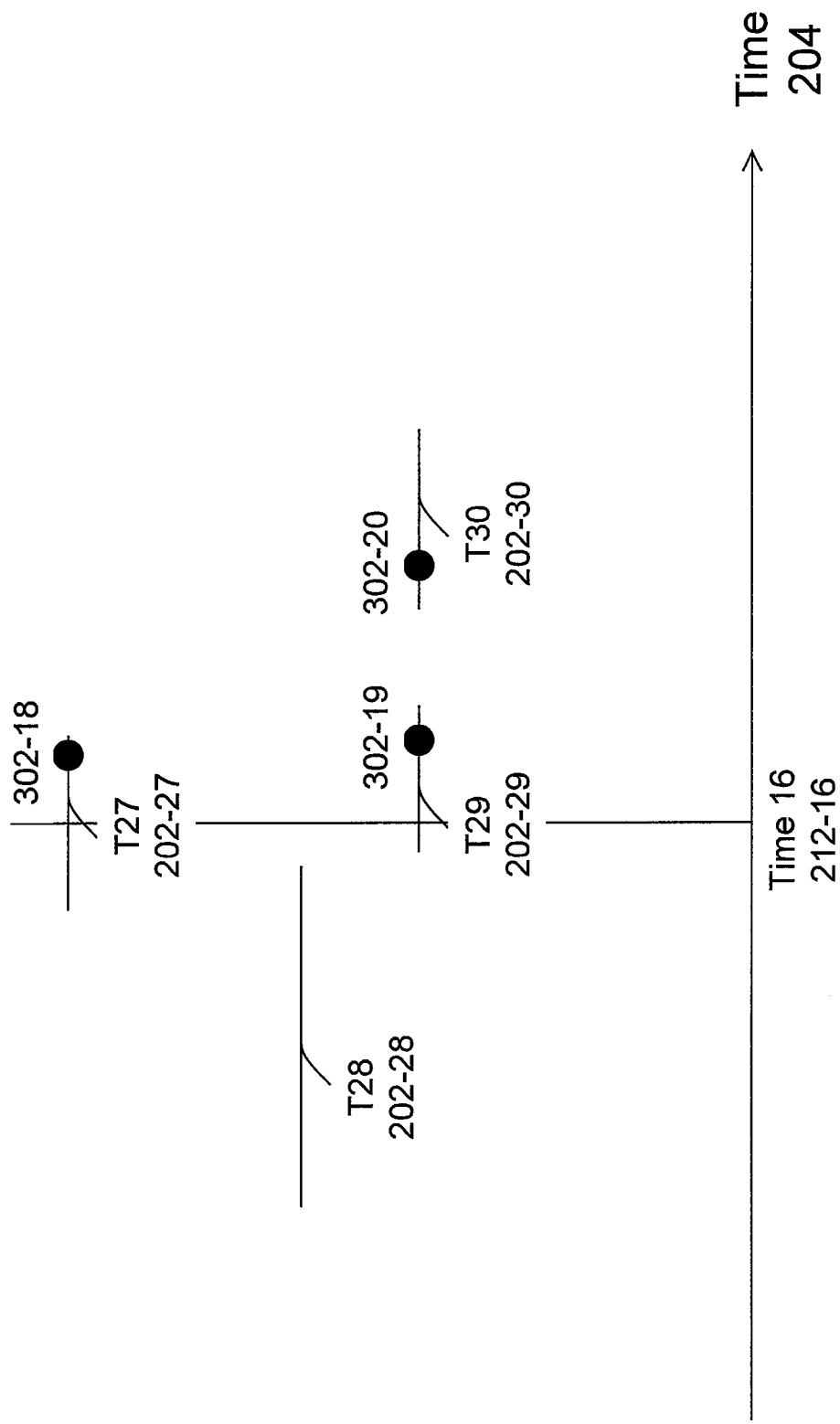

CHECKPOINT-FREE IN LOG MINING FOR DISTRIBUTED INFORMATION SHARING

PRIORITY CLAIM; CROSS-REFERENCE TO RELATED APPLICATIONS

This application claims the benefit and priority under 35 U.S.C. §120 as a Divisional of U.S. patent application Ser. No. 11/831,447, which is entitled "CHECKPOINT-FREE IN LOG MINING FOR DISTRIBUTED INFORMATION SHARING" and which was filed by LIK WONG et al. on Jul. 31, 2007, now U.S. Pat. No. 7,801,852 the entire contents of which is hereby incorporated by reference as if fully set forth herein. The applicants hereby rescind any disclaimer of claim scope in the parent application(s) or the prosecution history thereof and advise the USPTO that the claims in this application may be broader than any claim in the parent application(s).

This application is related to U.S. patent application Ser. No. 11/831,478, entitled "COMBINING CAPTURE AND APPLY IN A DISTRIBUTED INFORMATION SHARING SYSTEM", filed by LIK WONG et al. on Jul. 31, 2007, the entire contents of which is hereby incorporated by reference for all purposes as if fully set forth herein.

FIELD OF THE INVENTION

The present invention relates to database systems and, more specifically, database systems that support information sharing through log mining.

BACKGROUND

Database systems are critical parts of many businesses. Typically, a database system generates redo logs, which records operations belonging to a stream of transactions performed by the database system. The mining of redo logs can be utilized in a variety of ways. For instance, a mined redo log can be utilized for replication, auditing, asynchronous event deliveries, asynchronous change data capture, and database restoration.

A mining process for the redo logs can be restarted due to various reasons. To limit the amount of a redo log that must be read, the mining process utilizes checkpoints. The checkpoints are recorded outside the redo logs and each checkpoint corresponds to a specific position in the redo log. A checkpoint represents a point in the transaction stream and provides access to data that permits a redo log to be read beginning at the checkpoint. Thus, when the mining process restarts after a failure or being stopped by users, it does not need to read the redo logs from the beginning of open transactions, but may instead begin at the first checkpoint preceding the failure and generate logical change records for distributed information sharing.

A simple way of making a checkpoint is to save data at the checkpoint which represents the current state of all transactions that are active, e.g., uncommitted, when the checkpoint is made. In a system that handles a large number of transactions, making such a checkpoint is expensive both as regards to the time required to make the checkpoint and as regards to the checkpoint's size. Over time, checkpoint management becomes more difficult as the checkpoints grow in number and consume an increasing amount of disk storage. As such, during restart, it can take the mining process quite sometime to figure out which checkpoint to use for restart. Periodic purging of large amount of checkpoint data also consumes significant system resource.

Therefore, a better mechanism, which would better support distributed information sharing through log mining, is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A through FIG. 3F are transaction sequence diagrams, according to embodiments of the present invention.

DETAILED DESCRIPTION

Figure 1:
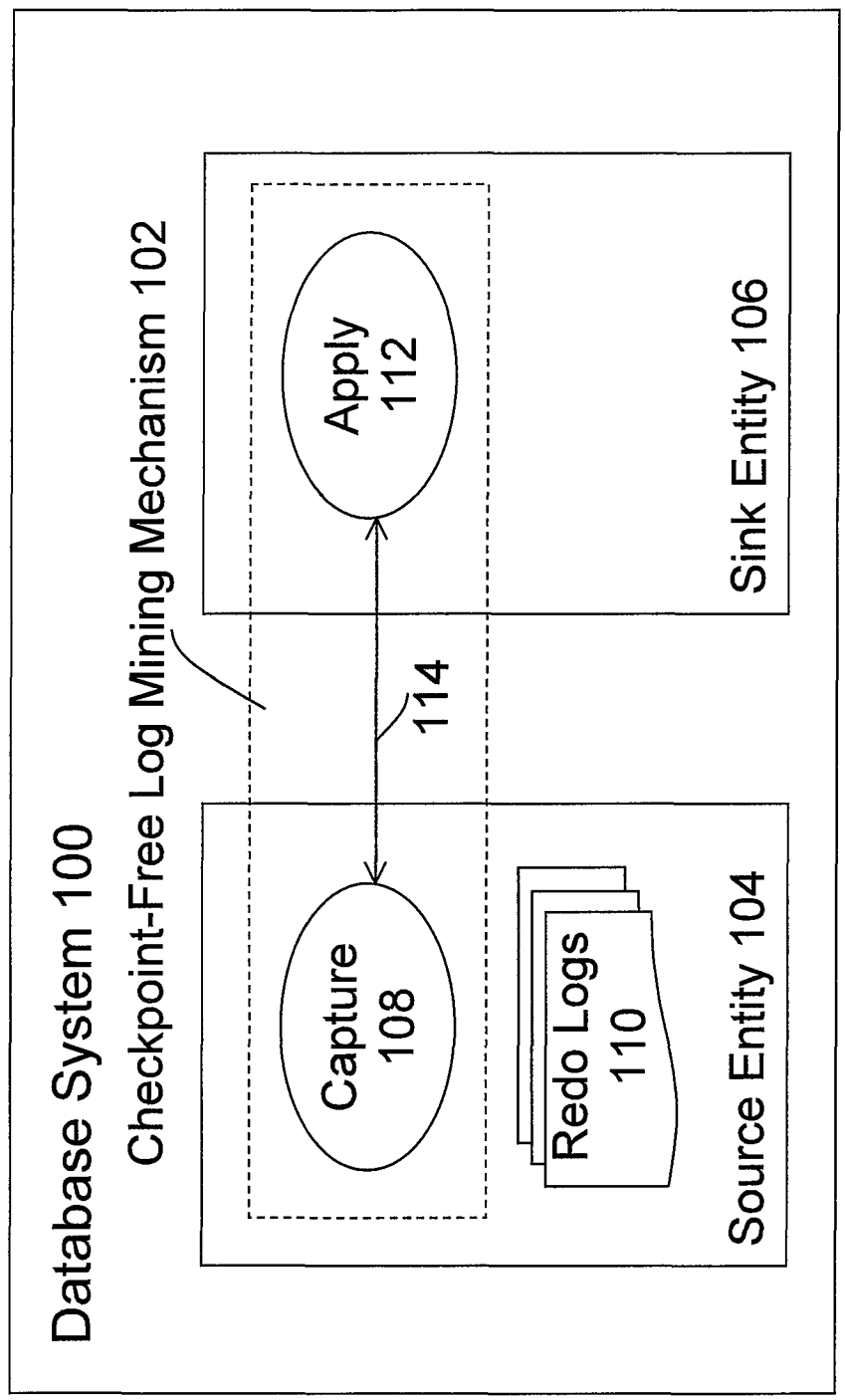
FIG. 1 is a block diagram of an example database system in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

Capture processes in a checkpoint mode work independently from apply processes or communicate directly with apply processes. As such, when a capture process in the checkpoint mode restarts, such a capture process is required to be able to autonomously (i.e., without any help from the apply processes) restart mining at any given point. For the purpose of recovering log mining on its own, the capture process must make log mining checkpoints as they continue to mine log information. Typically, the capture process takes the checkpoints either periodically (for example, in a thirty-second interval), or whenever log files for log mining checkpoints reach certain sizes (for example, at every incremental 1 M bytes). The taking of log mining checkpoints may be performed on the basis of individual user sessions. Thus, if a user session is long lasting (say weeks or months), or if tables touched by the user session are of large sizes (say gigabytes or terabytes), the log mining checkpoints may grow into an unmanageable size over the time.

In accordance with an embodiment of the present invention, a checkpoint free log mining mechanism may be implemented in a database system. In some embodiments, the checkpoint free log mining mechanism may comprise a capture process and an apply process that are logically associated with each other.

In this arrangement, the capture process may mine log information at a source entity (which, for example, where the database system is a distributed database system, may be a local database system in the database system) and publish the mined information to the associated apply process at a sink entity (which, for example, where the database system is a distributed database system, may be another local database system in the database system).

Correspondingly, the apply process accepts and consumes the mined log information published by the associated capture process. For example, the apply process may apply interesting data changes captured (i.e., mined and published) from the source entity to corresponding tables at the sink entity.

With the checkpoint free log mining mechanism, log mining does not need to take checkpoints in a steady state. Instead, log mining information published by the capture process to the apply process comprises a complete set of log information for each interesting transaction. In other words, if a transaction is interesting to the apply process, the associated capture process will deliver a complete set of log information for such a transaction. As used herein, the term "interesting transaction" refers to a transaction that comprises interesting data changes as part of the transaction or brackets interesting data changes made by interesting data changes from other transactions. Here, interesting data changes may refer to changes that have been specified as those that should be mined from the logs. For example, rules may be specified in the database system to define certain database operations and/or certain tables that should be mined at the source entity, published to and applied at the sink entity.

Log records of a transaction comprises a start transaction record, zero or more data change records, and an end transaction record. All the records for a given transaction can be correctly delivered by mining from the start transaction record. In some embodiments, the database system assigns a monotonically increasing number, known as system change number, to each such record of each such transaction processed by the database system.

In accordance with an embodiment of the present description, a system change number of a start transaction record of a transaction may be used to represent a logical time at which the entire transaction begins. Because of existence of the logical association between the capture process and the apply process, the two processes, in various circumstances as will be further explained, may work cooperatively to establish a safe time point in the form of a particular system change number in logs (for example, redo logs) to begin mining. In some embodiments, the particular system change number (SCN) that represents the safe time point to begin mining in the logs is a system change number that is assigned by the database system to a start transaction operation of a particular transaction. In an embodiment, this particular transaction represents the very last transaction that has been mined, published and applied by the capture process and/or the apply process. In another embodiment, this particular system change number represents the earliest start TX record of received by apply, but apply has not applied this transaction.

Since this particular change record belongs to the very first transaction that has not been processed by the checkpoint free log mining mechanism, all log records that are associated with this change number or a later assigned (thus a larger) system change number of a later start transaction record of a later transaction can simply be mined, published and applied by the mechanism. This is so because the database system assigns system change numbers to start transaction records of transactions in a monotonically increasing order.

In some embodiments, this particular SCN (which is moving as log mining progresses from transaction to transaction) is made persistent by the apply process. In various embodiments, the capture process and the apply process in this checkpoint free log mining mechanism cooperate to establish or re-establish such a particular SCN (or safe time point) for log mining in various circumstances such as in an initial startup state, in a steady state, in a process restart scenario in the middle of checkpoint free log mining, or in a transition between the checkpoint mode and the checkpoint free mode. Because a complete set of log information for each interesting transaction is to be delivered by the capture process in the checkpoint free log mining mode, and because transactions in the database system may be processed concurrently, inflight transactions (explained further below) at the safe time point must be dealt with in an appropriate manner in all these various circumstances. As used herein, the term "inflight transactions" refers to transactions that a time point in the redo logs at which the capture process is currently mining has passed time points that are associated with the transactions' start transaction records. In other words, at the current mining point, the capture process has not seen these transactions' start transaction records.

For example, in a steady state, the capture process may simply ignore any inflight transactions and only mine log records that are associated with a later transaction than the particular transaction for which the particular SCN signals its start time point.

If either the capture process or the apply process restarts in the middle of such a steady state, once the logical association is re-established between new incarnations of the processes, the particular SCN may be re-established between the apply process and the capture process, since the apply process maintains the particular SCN or since the apply process may retrieve the particular SCN from persistent data store. Once such a particular SCN is re-established, inflight transactions (i.e., transactions the capture process has not seen their start transaction records) must have been consumed by the apply process and can be safely ignored.

Even in transitional states such as switching from the checkpoint mode to the checkpoint free mode, or initially starting up, the capture process and the apply process can cooperate to establish the particular SCN to begin safe mining. For example, in an embodiment, the checkpoint free log mining mechanism may employ a look-back approach to trace back to all inflight transactions and determine the system change number of the earliest start transaction record among those inflight transactions; such earliest start transaction SCN is used as a boundary for beginning log mining in the checkpoint free mode.

In an alternative embodiment, the checkpoint free log mining mechanism may employ a look-forward approach to allow log mining to continue in the checkpoint mode for all the inflight transactions to finish up. In that embodiment, a system change number of a redo record that is being mined at or following the particular time of the request (to switch the capture process and the apply process to the checkpoint-free mode) may be established as a boundary for log mining in the checkpoint free mode.

Other runtime conditions such as a long period of absence of any interesting transactions or interleaving non-interesting transactions are cooperatively handled by the capture process and the apply process. For example, if there is no interesting transaction for an extended period, the particular SCN may be advanced by specially created ping records so that, on restarting, the checkpoint free log mining mechanism can safely begin mining at a (bounded) point that is not too distant in the past.

In addition, if non-interesting transactions are interleaved in between interesting transactions, under certain scenarios, these non-interesting transactions may be squeezed out from being sent to the sink entity.

In this manner, checkpoint free log mining may be performed in the database system in an efficient manner because a safe time point in log mining may be established by cooperating capture and apply processes in various circumstances.

The mechanism in various embodiments of the invention may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Example System

FIG. 1 illustrates an example database system 100 that comprises a checkpoint-free log mining mechanism 102 for log mining and information sharing between a source entity 104 and a sink entity 106, in accordance with an embodiment of this description. For the purpose of this invention, the database system (100) may be of any type. For example, the database system may be, but is not limited to, a distributed database system that comprises multiple database systems. In such a distributed database system, the source entity (104) may be a local database system while the sink entity (106) may be a remote database system.

As a part of checkpoint-free log mining mechanism 102, a capture process (also know as a mining process) 108 may be deployed at the source entity 104 to mine information in one or more redo logs 110 that record operations belonging to a stream of local transactions performed at the source entity. The information mined from the one or more redo logs (110) may be provided (or published) by the capture process (108) to an apply process 112 deployed at the sink entity (106). The apply process (112) is a consumer process for the mined information and may be, but are not limited to, a data replication process.

Example Logs

Figure 2:
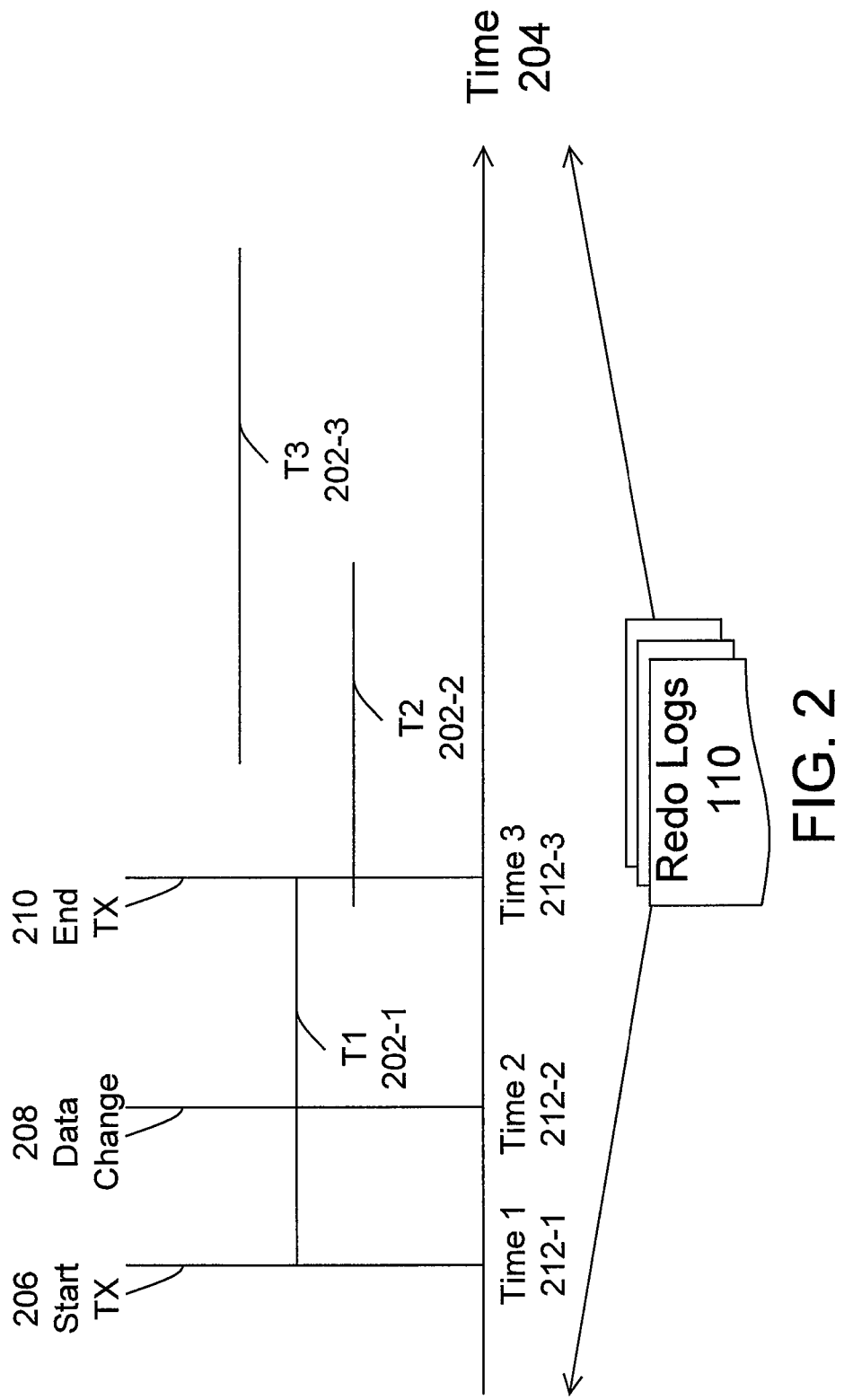
FIG. 2 is a diagram that illustrates example redo logs in accordance with an embodiment of the present invention.

As noted, in some embodiments, the mining of information for the purpose of sharing between entities in a database system such as 100 is performed with redo logs such as illustrated in FIG. 1. FIG. 2 illustrates example redo logs, in accordance with some embodiments of this description. In an embodiment, redo logs 110 (sequentially) records a series of transactions in the database system 100 (for example, local transactions that occur at source entity 104 and distributed transactions that involves data changes at source entity 104), shown as T1, T2 and T3 (i.e., 202-1 through 3), along a time (direction) 204.

Transactions in database system 100 may be executed concurrently. For example, as illustrated in FIG. 2, T1 (202-1) overlaps with T2 (202-2) along time 204. Likewise, T2 (202-2) overlaps with T3 (202-3) along time 204.

In some embodiments, a transaction such as T1 causes three distinct types of information to be stored in redo logs 110. The first type of transaction information stored in redo logs 110 is start transaction information (Start TX 206), which is created at Time 1 (212-1) when T1 comes into existence. The second type of transaction information stored in redo logs 110 is data change information (Data Change 208), which may be created/appended zero or more times depending on how many data change operations involved in the transaction (T1). As illustrated, a data change operation occurs at Time 2 (212-2), which causes database system 100, or its logging facility, to create the data change information (208) as illustrated. The third type of transaction information stored in redo logs 110 is end transaction information (End TX 206), which is created at Time 3 (212-3) when T1 comes into its end.

It should be noted that the time 204 is not necessarily the (wall) time at which the capture process or the apply process is running, rather, represents a segment of past time that is captured by redo logs 110. In some situations, the capture process and the apply process may share transactional information near real time. That is, information about a transaction is recorded into redo logs 110 in near real time and the mining and sharing of the information also happen near real time. In such situations, the wall time and a particular point of time 204 at which point the capture process is mining information from redo logs 110 may be very close. In other situations, however, the mining and sharing of the information may happen far behind the wall time.

System Change Number

In some embodiments, the capture process (108) mines information from redo logs 110, turns the mined information into redo records, and then publishes (or enqueues) the redo records to other communication parties such as the apply process (112). In some other embodiments, the information in redo logs 110 is already in the form of redo records. Thus, the capture process (108) can simply retrieves these redo records as appropriate. Therefore, the term "a redo record in the redo logs" may refer to either a redo record retrieved from redo logs 110 or a redo record derived from information stored in redo logs 110.

Since a transaction 202 comprises a number of operations, based on information stored in the redo logs (110), a redo record may be created for each of the number of operations in the transaction. In one embodiment, each data change operation in a transaction 202 is assigned a unique system change number. In addition, start transaction and end transaction operations are considered as data change operations. As a result, not only data change redo records, but also start transaction and end transaction redo records, may store unique system change numbers that are assigned to their respective operations by the database system (100).

A new system change number is assigned at the time when a new database operation occurs. In some embodiments, a system change number is a positive integer that ranges to very large numbers. In a particular embodiment, system change numbers are assigned in a round-robin manner. That is, once the highest ceiling number for system change numbers is reached, the next system change number is assigned from a number that is close to zero. Various algorithms may be employed in the processes of this description to recognize that a very small system change number may be a later-assigned (thus semantically a greater) number than a few system change numbers with very large numbers.

Redo records for a single transaction 202 comprise a start transaction record, zero or more data change records, and an end transaction record. In accordance with an embodiment of this description, redo records related to such a transaction 202 (for example, T1) are each assigned a system change number. As noted before, system change numbers, in some embodiments, may be assigned in a sequentially and monotonically increasing order. In these embodiments, a system change number of a start transaction operation of a transaction 202 is of the smallest value among all system change numbers assigned to redo records of the same transaction 202. Furthermore, if a start transaction operation of a transaction 202 is assigned a system change number of N, then a start transaction operation of the next transaction 202 will be assigned a higher system change number, say N'.

In some embodiments, since both system change numbers (except when they are wrapped around when an very large upper limit such as $2^{32}$ or $2^{64}$ for the system change numbers is reached) and time increases monotonically, a system change number may logically represent a point in time when the system change number is assigned.

Data Change Records and Read-Only Records

Data change records are associated with the above-mentioned data change operations. As noted, each data change operation may cause change to one or more database records in the database system (100). For example, a data change record in the redo logs (110) may be associated with an insertion operation that inserts a row in a table in the database system (100).

The end transaction record in the redo logs records the end of the transaction (for example, 210 of FIG. 2), such as commit, rollback, abort, etc. Except for commit, the other types of endings of the transaction generally cause the database system (100) to rollback any tentative changes that have been made by the operations associated with (or giving rise to) the data change records.

In some embodiments, a transaction 202 may further comprise a number of read operations that would not cause changes to database records in the database system (100) even if the transaction is committed. In some embodiments, the capture process (108) may treat these read-only redo records in the same way as it treats the data change records. In other words, these read-only records may be published, just as data change records are, in these embodiments. In some other embodiments, the capture process (108) may ignore (i.e., not publish) these read-only redo records.

Without loss of generality of this invention and only for the purpose of illustration, in the discussion hereinafter, redo records may comprise start transaction records, end transaction records, and data change records, as noted before, but not read-only records.

Concurrent Transactions

As noted before, the source entity (104) may have a number of transactions 202 concurrently being processed by the database systems, such as T1 and T2 as illustrated in FIG. 2. As a result, redo records for a number of transactions that wholly or partly overlap with each other in time may be interleaved in the redo logs (110). However, start transaction records in the redo logs (110) are in the same sequentially, monotonically increasing order as their system change numbers are assigned.

Steady State

In one embodiment, when initially starting up, the capture process (108) establishes an association 114 with the apply process (112). In a steady state of this association, the capture process continuously reads records in the redo logs (110) in the same sequential order as those redo records are written into the redo logs (110). Correspondingly, the redo records are read in the same sequential order as operations associated with the records occur in time. In some embodiments, reading and sending the redo records in the same sequential order as the associated operations occur at the source entity allows the capture process (108) to convey the same semantic information of transactions to the apply process (112) at the sink entity (106).

Interesting Data Change Records

Some of these data change records read by the capture process (108) may be determined as interesting data change records. As used herein, the term "interesting data change records" refers to redo records at the source entity (108) that have information about certain operations on certain tables in the database system (100) such that the certain operations on the certain tables have been specified as interesting to the checkpoint-free log mining mechanism (102). For example, configuration files or rule databases may be used to specify the certain operations on the certain tables are interesting and any redo records on these operations are to be determined as interesting data change records.

Having been so determined, the data change records that are considered as interesting are then published by the capture process (108) to the apply process (112) in the association in the same order as they are read. At the other end of the association (114), the apply process (112) generally consumes (or dequeues) these publishable records in the same order as they are published. In a particular embodiment, data changes represented by the published records may wholly or partially be applied at the sink entity (106).

Persistent System Change Number

In the steady state of the checkpoint free mode, the apply process (112) persists a particular system change number. This particular SCN is the earliest system change number of a start transaction operation of a transaction 202 that has not been consumed. All transactions 202 with start transaction records having lower system change numbers than the particular SCN have been completely consumed. As used herein, a transaction 202 is said to be consumed when the apply process (112) has finished processing with an end transaction record of the transaction. Therefore, since redo records are processed sequentially, where the end transaction record of the transaction has been consumed, all redo records related to the transaction have also been consumed by the apply process (112).

In some embodiments, since system change numbers are issued in an ascending order along the time direction, all subsequent system change numbers issued to start transaction operations of subsequent transactions will be greater than this particular SCN. As the apply process (112) continuously consumes interesting records and thus related interesting transactions, this particular SCN will continuously be incremented in the steady state.

Apply Process Restarts

Since the capture process (108) and the apply process (112) can be separate processes (possibly on different machines), the capture process and the apply process may restart asynchronously in the middle of this steady state of the checkpoint-free log mining mechanism. In one embodiment, since the particular SCN is made persistent by the apply process (112), if the apply process restarts, upon restarting, the apply process can find where to start consuming published redo records by simply retrieving the persistent particular system change number. For example, at the time when the capture process (108) and the apply process (112) reestablish their association 114, the particular SCN can be communicated (or notified) to the capture process (108) by the apply process (112). Upon receiving the particular SCN, the capture process (108) may re-position mining from this particular SCN.

Capture Process Restarts

Similarly, if the capture process (108) restarts, upon restarting, the capture process reestablish association 114 with the apply process (112). The particular SCN maintained by the apply process (112) is then communicated to the capture process (108). Upon receiving the particular SCN, the capture process restarts mining from this particular SCN.

Figure 3A:
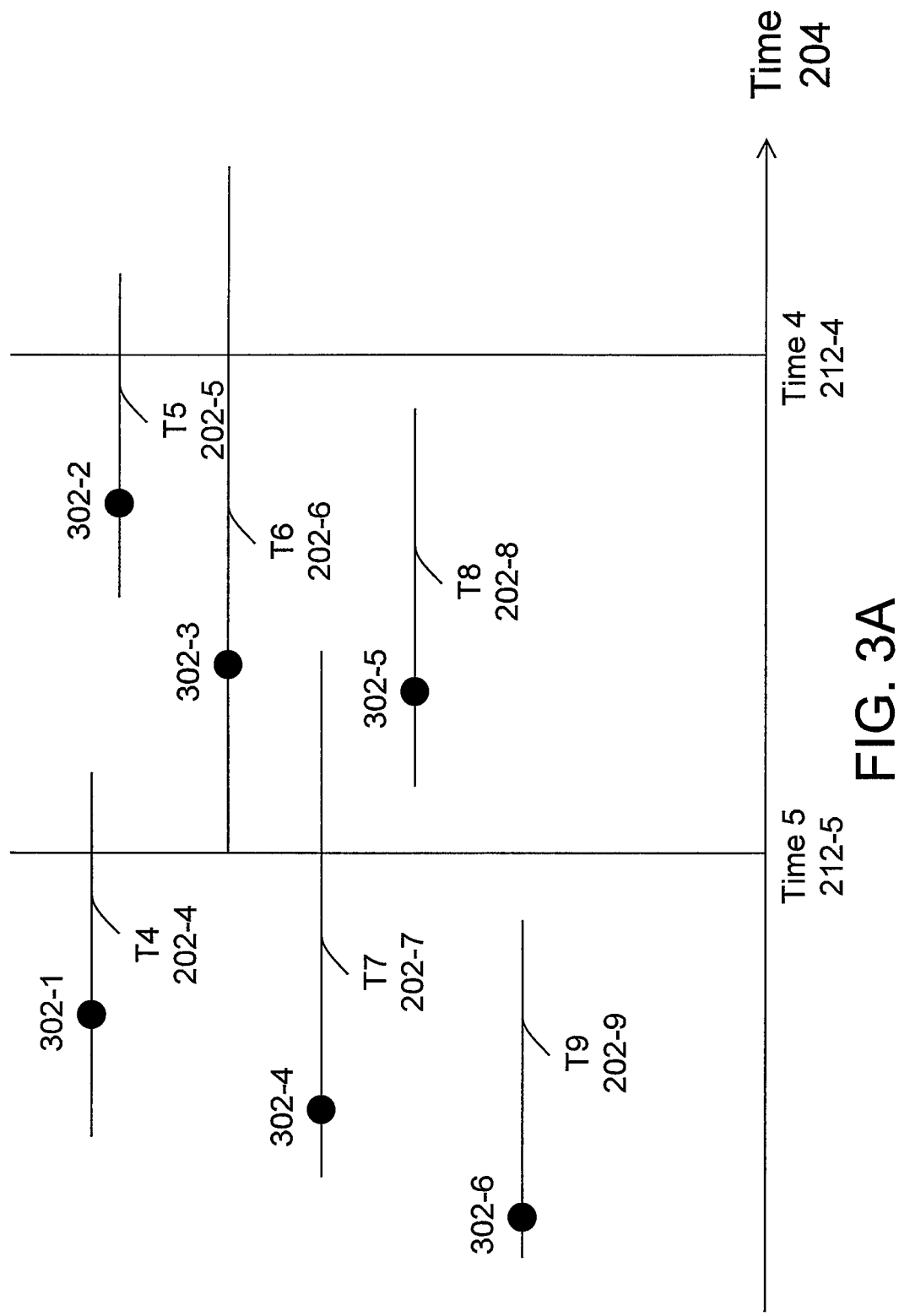
Figure 4A:
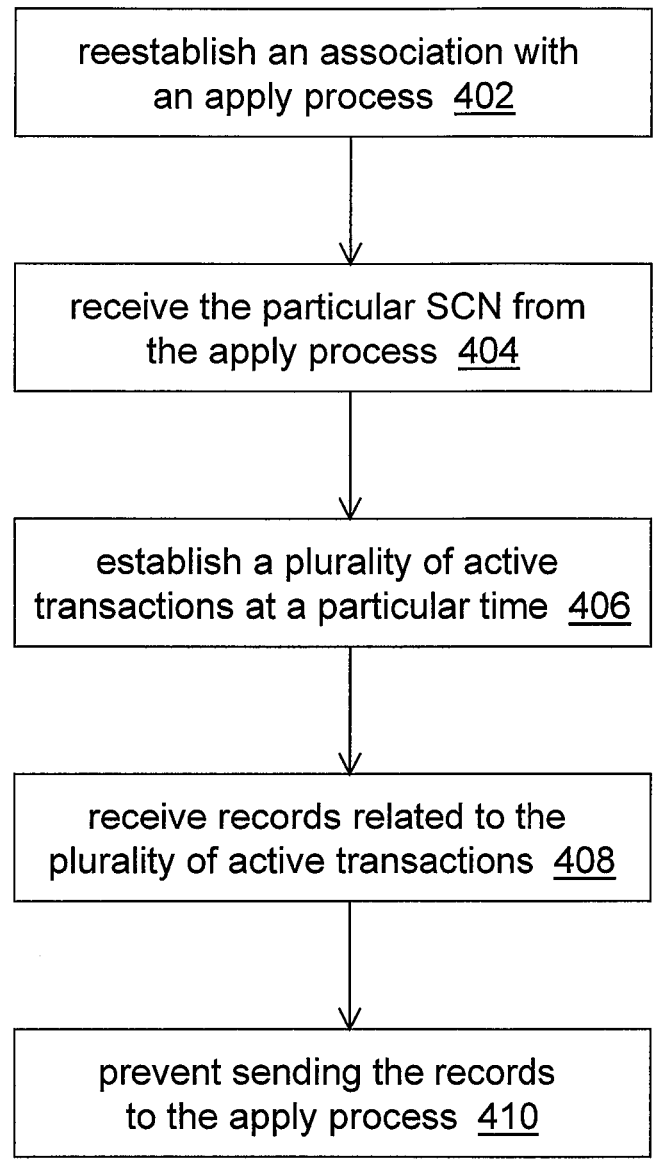
FIG. 4A through FIG. 4F are flow diagrams illustrating example processes, according to embodiments of the present invention.

In the following discussion, reference will be made to a transaction sequence diagram of FIG. 3A, and to a flow diagram of FIG. 4A. Here, solid dots 302 (for example, 302-1 through 6 of FIG. 3A) represents interesting redo records (generated) in transactions. Specifically, when the capture process (108) restarts at a time, say Time 4 (212-4 of FIG. 3A), in block 402 of FIG. 4A, the capture process reestablishes an association 114 with the apply process (112). As noted, the apply process stores (or persists) a particular SCN as the lowest value for all subsequent system change numbers of start transaction operations of transactions. Once the association (114) is reestablished, the apply process sends, and the capture process receives in block 404 of FIG. 4A, the particular SCN. In this example, the particular transaction whose start transaction operation is assigned the particular SCN is T6 (202-6 of FIG. 3A). In block 406 of FIG. 4A, the capture process establishes a plurality of active transactions at the particular time, excluding the particular transaction, whose start transaction record has been assigned the particular SCN. This establishment may be performed by mining the redo logs (110), or by querying transaction history maintained by the database system, or by doing both. This plurality of active transactions that was active at the particular time is known as inflight transactions at the particular time. In this case, as illustrated in FIG. 3A, the plurality of active transactions at the particular time (i.e., Time 5) comprises T4 (202-4) and T7 (202-7). Thus, T4 and T7 are inflight transactions at Time 5. On the other hand, T9 (202-9 of FIG. 3A) is a past transaction at Time 5. Similarly, T5 (202-5 of FIG. 3A), T6 (202-6 of FIG. 3A) and T8 (202-8 of FIG. 3A) are future transactions relative to Time 5.

In one embodiment, even though the inflight transactions at the particular time may continue to generate data change records and end transaction records in the redo logs (110), these redo records are ignored (i.e., not published) by the restarted capture process (108). This is so because the fact that the particular SCN is sent by the apply process (112) indicates that all transactions whose start transaction operations have system change numbers that are smaller than the particular SCN have been consumed by the apply process during a prior session of association between the capture process and the apply process. Therefore, even though, in block 408 of FIG. 4A, the capture process (108) may still receive one or more records that are related to the plurality of active transactions that have been identified as active at the particular time (i.e., Time 5 in this example), the capture process, in block 410, prevents sending the one or more records to the apply process (112).

In the present example, as the capture process mines the redo logs (110), it will receive redo records related to T4 and T7 of FIG. 3A. However, since these are the redo records of the inflight transactions at Time 5, these redo records will be prevented from sending to the apply process (112).

Uninteresting Transactions

A transaction that does not itself generate any interesting data change record is known as an uninteresting transaction. A transaction that does not itself generate any interesting data change record is known as an uninteresting transaction. In some embodiments, the capture process, using rules and/or configuration file information to determine whether a transaction is uninteresting or interesting.

In some embodiments, even if a transaction is uninteresting, by virtue of bracketing an interesting data change record of another transaction, the start transaction record and the end transaction record of the uninteresting transaction will still be published to the apply process, for the purpose of conveying an underlying semantic context in which the interesting data change record has occurred. Here, the term "bracketing" refers to that the interesting data change record is generated in between a start transaction record and an end transaction record of the uninteresting transaction. For example, a first transaction may start at a first time. There may be an interesting change for a second transaction at a later time, say a second time. Even though there may not be any interesting changes for the first transaction between the first time and the second time, when the capture process sees an interesting change for the second transaction at the second time, the capture process sends a start transaction record for the first transaction. The reason is that the capture process does not know at the second time if there will be an interesting change for the first transaction after the second time. In one embodiment where the capture process cannot efficiently look ahead to make such a determination (i.e., whether the first transaction may have its own interesting data change records or not). Thus, sending the start transaction record of the first transaction before sending the interesting changes for the second transaction ensures that the data stream associated with log mining and information sharing would obey the monotonically increasing order. A corollary of this strategy (i.e., sending a start transaction record of a transaction that brackets an interesting data change of another transaction) is that, once the start transaction record is sent, the capture process also sends an end transaction record of the bracketing transaction. Otherwise, the apply process may indefinitely wait for such an end transaction indication (or record).

In these embodiments, for the purpose of reducing communication costs, an optimization can be implemented by the capture process to squeeze out those uninteresting transactions that are empty. As used herein, the term "empty" or "empty transaction" refers to a situation where an uninteresting transaction does not bracket any interesting data change record of any other transactions. Since there is no interesting data change record that is concurrent with an empty transaction, the empty transaction needs not to be provided to the apply process.

In these embodiments, the capture process maintains a list of start transaction records. While mining the redo logs, at a first time (e.g., Time 6 212-6 of FIG. 3B), the capture process may receive a particular start transaction record (block 422 of FIG. 4B), which may be a start transaction record of an uninteresting transaction (such as T11 202-11 of FIG. 3B). As used herein, unless otherwise stated, any mentioning of a time (such as "a first time" here) refers to a (past) time when an operation described by a redo record that the capture process reads occurred, not the time when the capture process actually performs the act of reading that redo record.

Figure 3B:
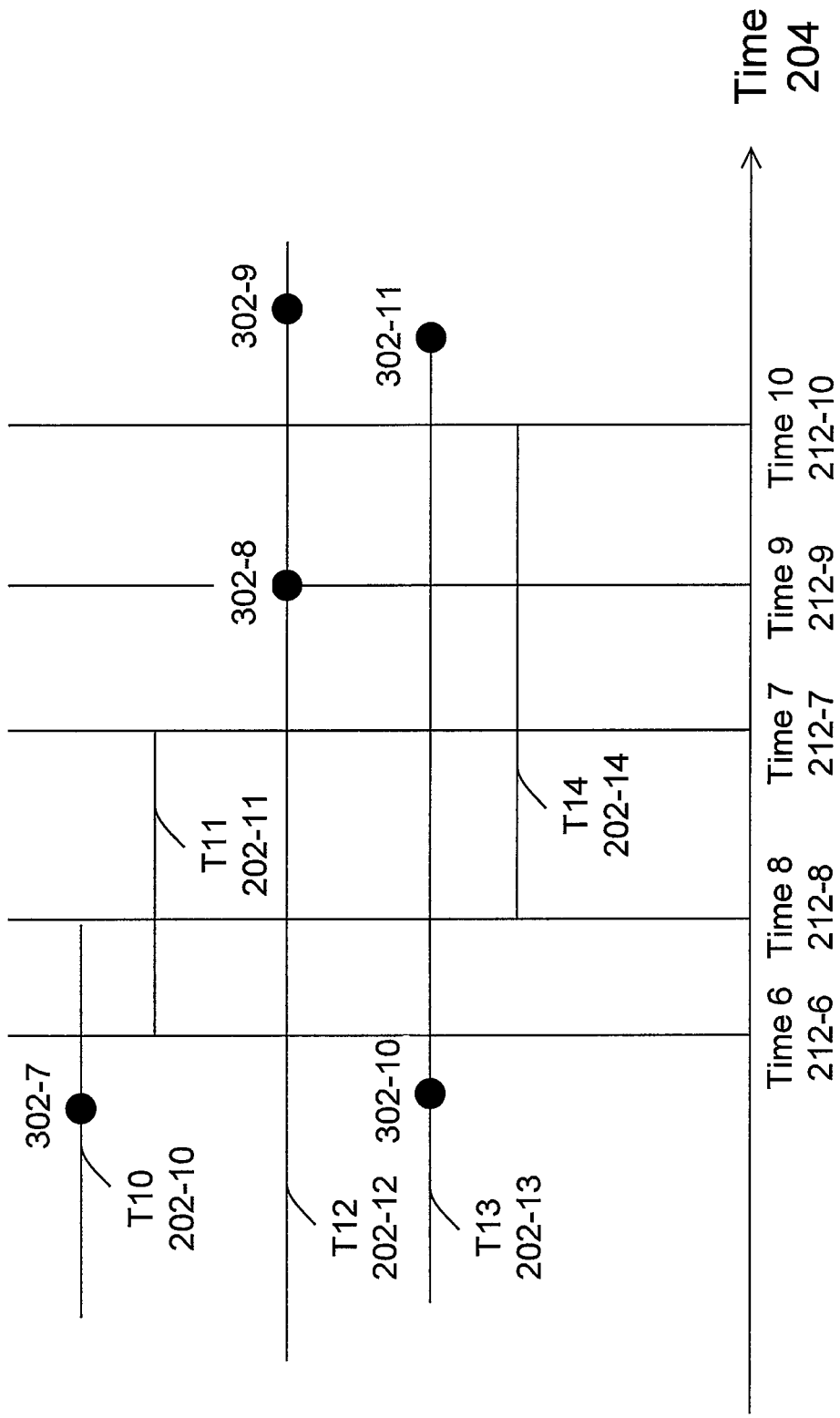
Figure 4B:
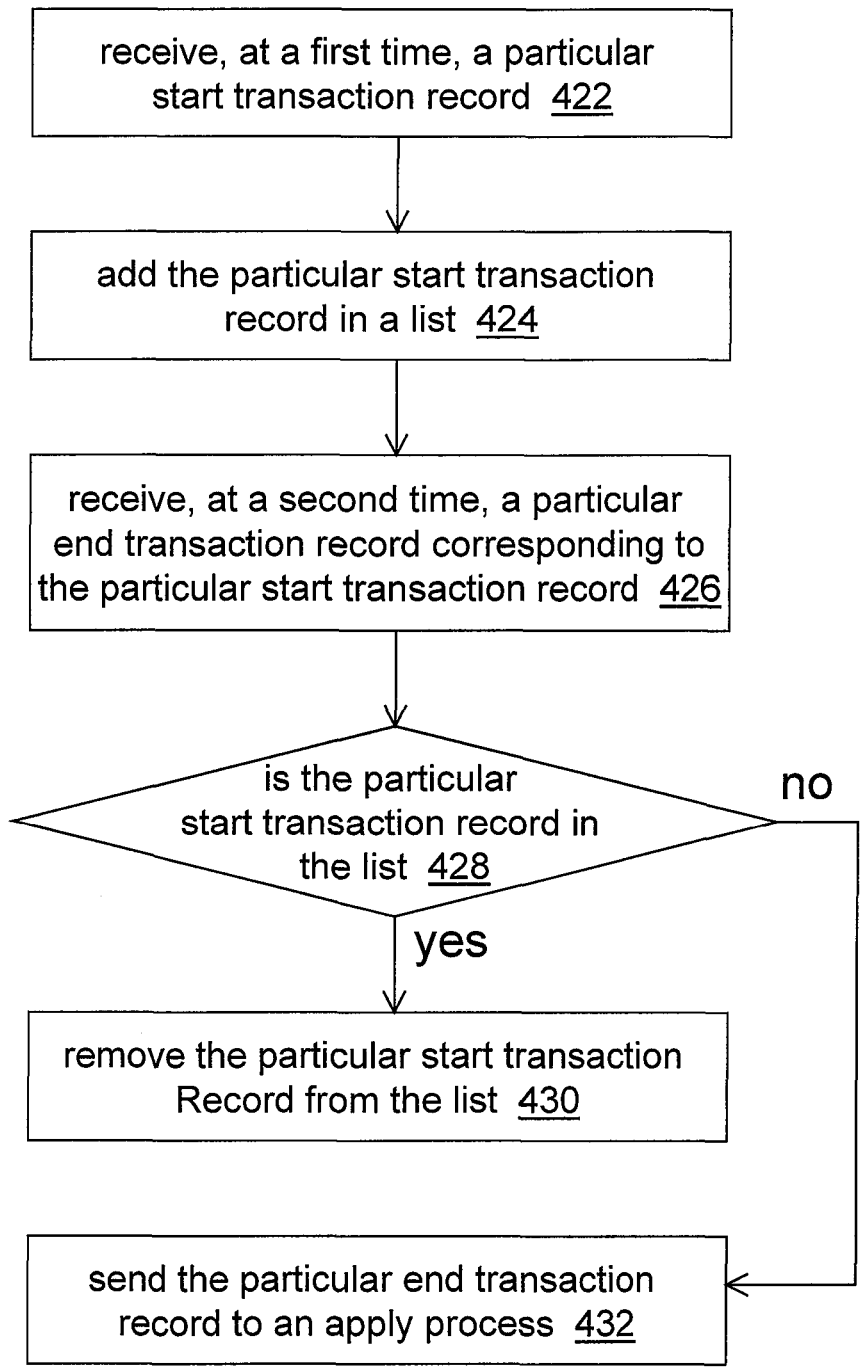

Next, in block 424 of FIG. 4B, the capture process (108) adds the particular start transaction record (e.g., that of T11 of FIG. 3B) in the list of start transaction records. This may be done, for example, by storing the particular start transaction record in an entry of the list. Depending on operational activities of the database system (100) at the first time, the list may comprise entries that store zero or more start transaction records before the particular start transaction record is added to the list.

In the present example of transaction configuration as illustrated in FIG. 3B, as interesting redo records are indicated as solid dots 302 (302-7 through 11). Thus, T10 (202-10), T12

(202-12), and T13 (202-13) of FIG. 3B are interesting transactions by virtue of comprising interesting redo records. On the other hand, T11 (202-11) and T14 (202-14) of FIG. 3B are uninteresting transactions.

Empty Transactions

While continuing mining the redo logs (along Time 204), at a second time (e.g., Time 7 212-7 of FIG. 3B) that is later than the first time (i.e., Time 6 in this example), the capture process (108) may receive a particular end transaction record that signals an end of the transaction (T11) whose beginning is signaled by the particular start transaction record that was previously received. Accordingly, in block 428 of FIG. 4B, the capture process (108) determines whether the particular start transaction record still exists in the list. In this example, since there is no interesting redo record bracketed by T11, the particular start transaction record previously received will still be in the list. Correspondingly, the capture process (108) determines that the particular start transaction record still exists in the list (i.e., the "yes" path after block 428 of FIG. 4B). In response to determining that the particular start transaction record still exists in the list, the capture process (108) determines that there is no interesting data change record following that particular start transaction record and hence removes it from the list (block 430 of FIG. 4B).

Non-Empty Uninteresting Transactions

As illustrated in FIG. 3B, unlike T11, transaction T14 (202 14 of FIG. 3) brackets interesting redo record 302-8. At Time 8 (212-8 of FIG. 3B), a start transaction record for T14 is added to the list. At Time 9 (212-9 of FIG. 3B), an interesting redo record from a different transaction (i.e., T12) is received. Therefore, transaction 14 is said to bracket an interesting redo record and hence not an empty transaction. As will be further explained, the list that stores start transaction records as described herein is flushed and sent to the apply process in the (for example, ascending) order of system change numbers when an interesting redo record such as 302-8 is received. As a result, at Time 10 (212-10 of FIG. 3B), when an end transaction record of T14 is received, the capture process (108) determines that the start transaction record of T14 does not exist in the list (i.e., the "no" path of block 428 of FIG. 4B). In response to determining that the particular start transaction record does not exist in the list, the capture process (108) determines that there has been an interesting data change record following the particular start transaction record (in this "no" path of block 428, this particular start transaction record is the start transaction record of T14) and hence sends the particular end transaction record (in this "no" path of block 428, this particular end transaction record is the end transaction record of T14) to the apply process (112).

Flush the List

While mining the redo logs, the capture process may receive, at a third time (for example, at Time 9 212-9 of FIG. 3B), a particular interesting data change record. Here, the third time may be before or after the first time, or before or after the second time. Upon receiving such a particular interesting data change record, the capture process (108) looks up in the list and sends all start transaction records that currently exist in the list and then empties the list by removing all the start transaction records that currently exist in the list. In a particular embodiment, all the start transaction records in the list are sent by the capture process (108) to the apply process in the same order as they appear in the redo logs (110). In addition, the particular interesting data change record is also sent by the capture process (108) to the apply process (112).

Prolonged Period of Uninteresting Transactions

Figure 3C:
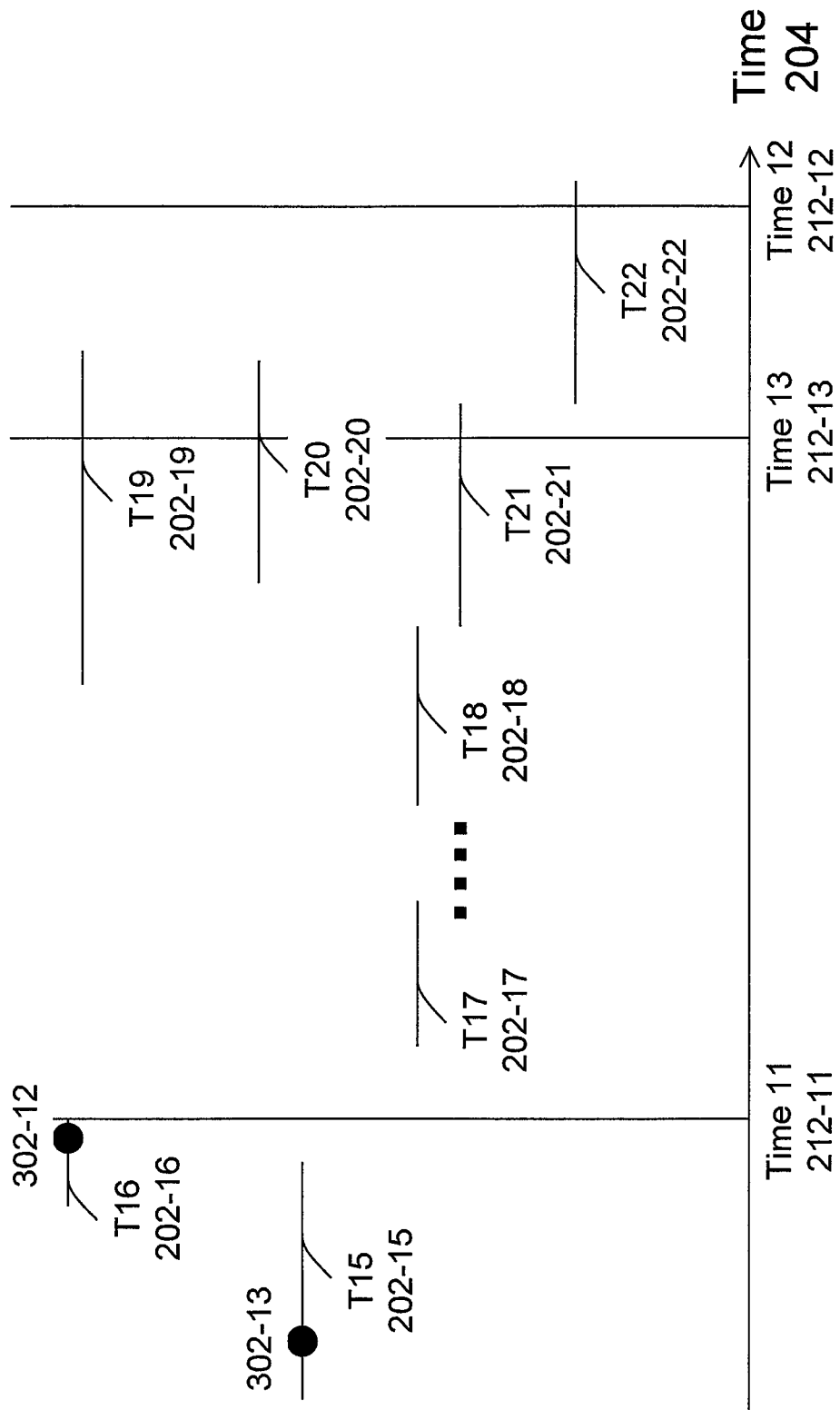

There may be a prolonged period where only uninteresting transactions occur. For example, as illustrated in FIG. 3C, between Time 11 212-11 and Time 12 212-12), there are only uninteresting transactions such as T17 through T22 (212-17 through 22 of FIG. 3C) and zero or more uninteresting transactions as represented by an ellipsis in FIG. 3C. As illustrated, the last interesting transaction (i.e., T16 212-16 with an interesting redo record 302-12) occurs at Time 11. Thus, a system change number assigned to start transaction operation of T16 is conveyed (or published) to the apply process (112 of FIG. 1) by the capture process (108 of FIG. 1) in a start transaction record of T16 (212-16 of FIG. 3C). Other transactions earlier than T16, such as T15 as shown in FIG. 3C, do not cause any new start transaction records with later system change numbers to be sent to the apply process, unless those other transactions overlap with an uninteresting transaction to make the latter a non-empty uninteresting transaction. In the present example, neither T15 (with an interesting redo record 302-13), nor T16, overlaps with any uninteresting transaction that starts within the particular period delimited by Time 11 and T12.

Thus, without an artificially created redo record, none of existing redo records in the redo logs (110) that are associated with transactions started within the particular period would be sent to the apply process. Therefore, without an optimization that will be shortly described, the particular SCN maintained by the apply process (112) would be very old. Consequently, if either the capture process (108) or the apply process (112) would restart after such a period, the capture process would receive and start mining the redo logs at this very old SCN, resulting much inefficiency.

Ping Record

To solve this problem, in accordance with some embodiments of the present invention, a ping record may be sent by the capture process (108) to the apply process (112) to advance the particular SCN maintained by the apply process.

In the following discussion, reference will be made to a transaction sequence diagram of FIG. 3C, and to a flow diagram of FIG. 4C. Specifically, in these embodiments, in block 442 of FIG. 4C, the capture process (108) determines, for a particular period, whether any record comprising some prior system change number has been sent to an apply process. This prior system change number, for example, may be a system change number that was assigned to an end transaction operation of T16 (212-16 of FIG. 3C) or a system change number corresponding to an interesting data change record in T16. The particular period may be a period delimited by Time 11 and Time 13 (i.e., 212-11 and 13 of FIG. 3C). In response to determining, for the particular period, that a record comprising a previous system change number has not been sent to the apply process, as that will be the case for the period between Time 11 and Time 13 as illustrated in FIG. 3C, the capture process performs a number of steps as follows. In block 444 of FIG. 4C, the capture process (108) can establish a plurality of active transactions that are active when the particular period ends (note again that this is the time when an operation corresponding to a redo log that the capture process is reading occurred, not the time when the actual reading of the redo logs is performed by the capture process). In the present example, the particular period ends at T13 (212-13 of FIG. 3C). The plurality of active transactions at Time 13 are T19 through T21 (i.e., 202-19 through 21 of FIG. 3C). The plurality of active transactions is in the start transaction record list. Once the plurality of active transaction at the end of the particular period is established, in block 446 of FIG. 4C, the capture process (108) then identifies a particular active transaction in the plurality of active transactions. This particular active transaction is so chosen that a particular system change number assigned to a start transaction record of this particular active transaction is the lowest value among a set of system change numbers that comprises all system change numbers of start transaction records of the plurality of active transactions. In the present example, since T19 starts the earliest time along the time direction (i.e., Time 204), T19 will be identified as the particular active transaction. Subsequently, in block 448 of FIG. 3C, the capture process (108) sends a ping record that comprises the particular system change number, such as the system change number associated with the start transaction record of T19 in this example, to the apply process (112). Since the particular system change number is the lowest of all the system change numbers assigned to the start transaction records of the plurality of active transaction at the end of the particular period, all transactions carry a system change number prior to the particular system change number are already completed—as used herein, the term "complete" means that the transaction is either committed or rollbacked. Thus, even if a restart occurs with respect to the capture process or the apply process, mining of the redo logs may start from the particular system change number, rather than a very old system change number that corresponds to an actual transaction consumed by the apply process prior to the particular period.

In this manner, checkpoint taking can be avoided in the steady state of log mining and information sharing between the capture process and the apply process.

Non-Steady State

Techniques are also provided in accordance with certain embodiments of the present invention to deal with two situations before a capture process and an apply process reach the steady state.

Initialization

First, the capture process and the apply process, without having been operating in a checkpoint mode, may be deployed the first time in the database system to operate in a checkpoint free mode. In the following discussion, reference will be made to a transaction sequence diagram of FIG. 3D, and to a flow diagram of FIG. 4D. In block 462 of FIG. 4D, the checkpoint-free log mining mechanism starting up, at a first time, a capture process, wherein the capture process is associated with an apply process, and wherein the apply process has not set a particular system change number as the lowest value for all subsequent system change numbers. This phrase "a first time" is an exception case to the usual meaning of "a time in the redo logs" in this description; here the term "a first time" refers to the actual (or wall) time when the capture process starts up, since, at this point, the capture process has not established a position of time in the redo logs (110) where log mining is to start.

Figure 3D:
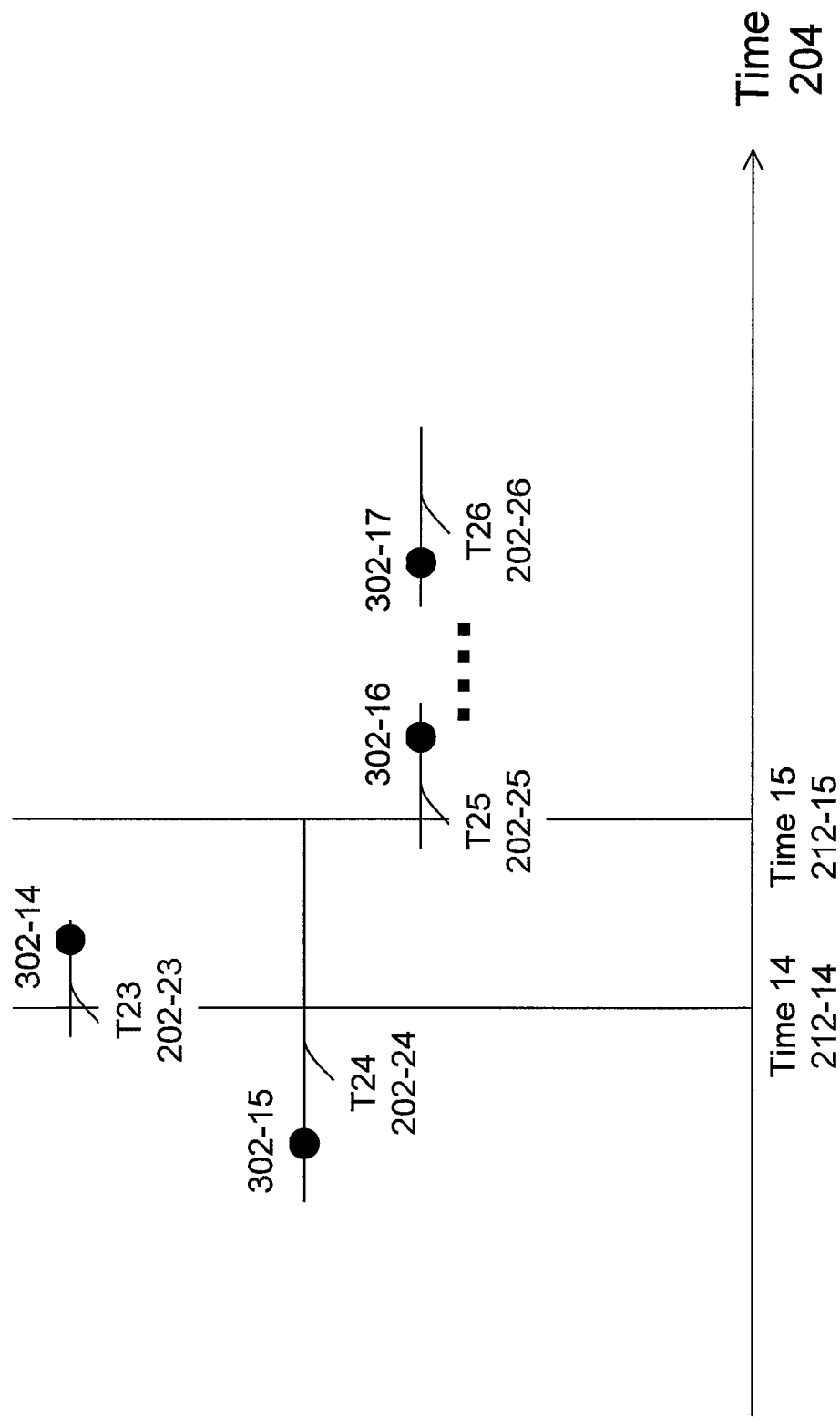

Referring to FIG. 3D, a capture process (108) at the source entity may start up at a first time such as Time 14, and subsequently establish an association 114 with an apply process (112) at the sink entity. The apply process at the sink entity has not set a particular system change number of a start transaction record of a transaction as the lowest value for all subsequent system change numbers. Thus, unlike the restart case discussed earlier, the apply process in the present example cannot supply a (persistent) particular SCN to the capture process to indicate where in the redo logs the capture process should begin to mine.

Figure 4C:
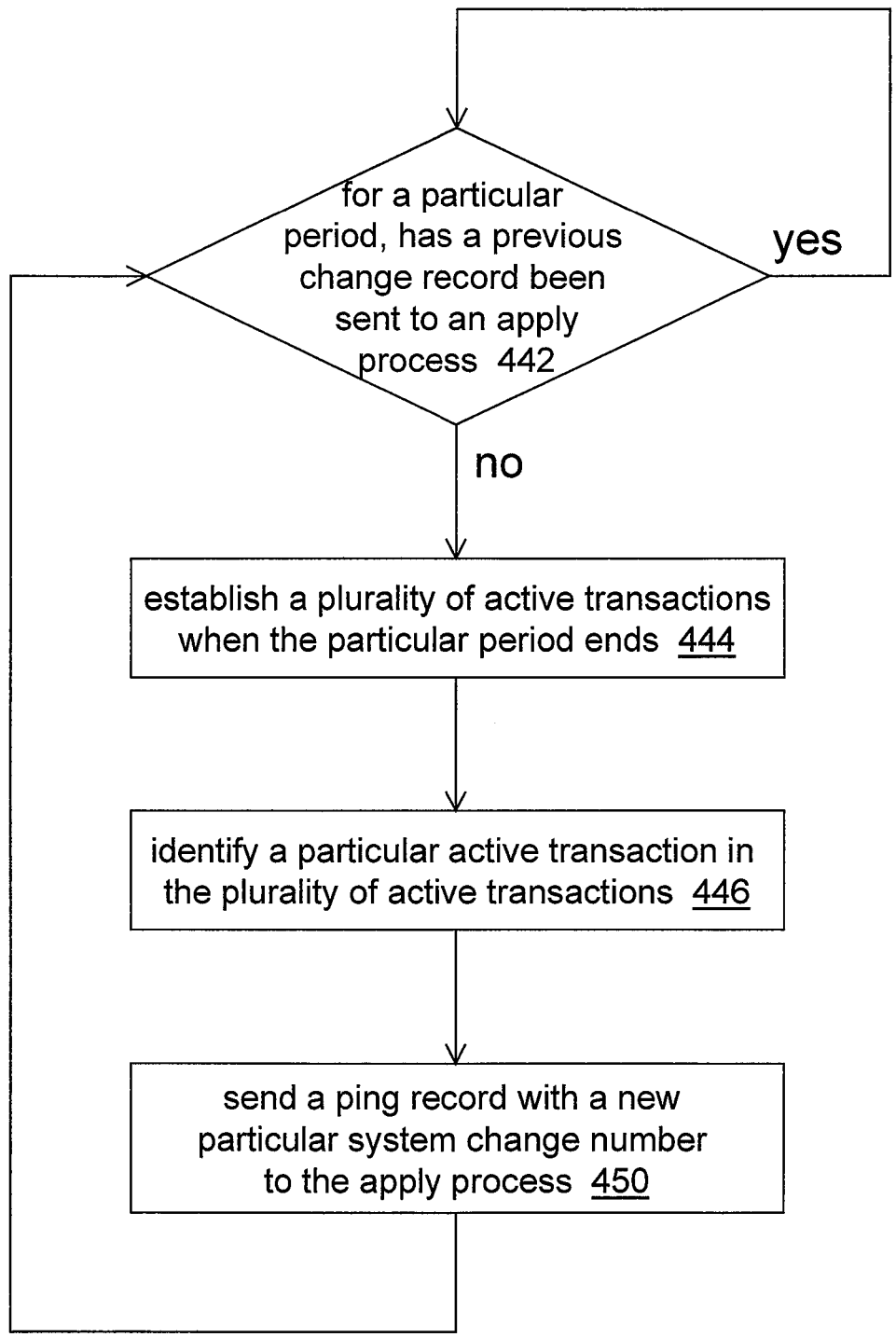
Figure 4D:
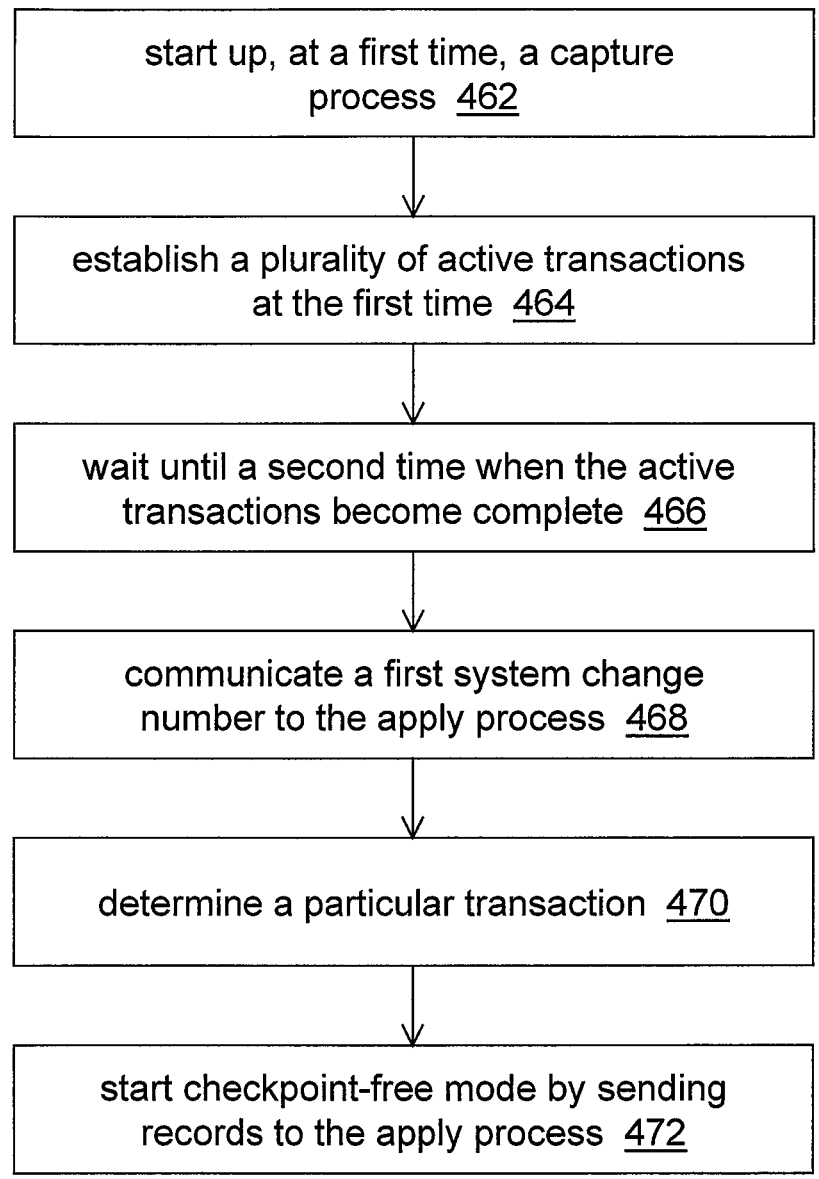

In block 464 of FIG. 4D, the capture process (108) establishes a plurality of active transactions at the first time. Referring to FIG. 3D, T23 (202-23) and T24 (202-24) are identified as active transactions at the first time (i.e., Time 14 212-14).

In block 466 of FIG. 4D, the capture process (108) waits until a second time when all of the plurality of active transactions complete In the present example, as illustrated in FIG. 3D, the capture process wait until a second time such as Time 15 (212-15), when all the active transactions (that are active at the first time) has now become complete.

In one embodiment where the apply process is a data replication process, once all the active transactions at the first time have become complete, "export" and "import" tools of the database system (100) may be used to capture information from the source entity and prepare and set up tables at the sink entity such that the tables at the sink entity contains all the changes in corresponding tables at the source entity including data changes made by the plurality of active transactions.

In block 468 of FIG. 4D, the capture process (108) communicates the first system change number (i.e., the system change number of the start transaction record of T25 202-25) to the apply process (112). The apply process in turn established this received system change number as a persistent particular SCN. In another embodiment, any system change number prior to the system change number associated with the start transaction record of T25 202-25 can also be the persistent particular SCN.

In block 470 of FIG. 4D, the capture process (108) determines a particular transaction that is immediately after the first active transaction. In the present example as illustrated in FIG. 3D, immediately following the plurality of active transactions is T25 (202-25), since its start transaction record occurs the earliest among start transaction records of all subsequent transactions that come into existence after the first time (i.e., Time 14 212-14). Thus, T25 is determined as the particular transaction in block 470 of FIG. 4D. In one embodiment, the particular transaction is the first transaction that is issued by the database system after the first time.

In block 472 of FIG. 4D, the capture process (108), along with the apply process (112), starts to operate in the checkpoint-free mode from the earliest start transaction of non-inflight transactions (i.e., T23 and T24 in the present example). In this mode, the capture process sends one or more records to the apply process. Here, each of the one or more records is associated with a transaction (for example, T26 202-26 with an interesting redo record 302-17) that is no earlier than the particular transaction such as T25 in the present example. In one embodiment, each such (subsequent) transaction either comprises or brackets an interesting redo record.

In some other embodiments, a safe time point for export/import may be determined using an online system (i.e., transactions processed by the online system as these transactions happen, as opposed to transactions in the redo logs that were processed by the system a while ago) of source entity. For example, as the online system is running, say at Time 14, a command may be issued for waiting until all inflight transactions at Time 14 complete. Say, such time (when all inflight transactions at Time 14 complete) is Time 15. After Time 15, export/import may be performed. When the capture process initially starts, it will start mining from the initial point, i.e., Time 14, since there is not yet a persistent system change number maintained by the apply process at this point. The capture process thereafter may discard any inflight transactions at Time 14 because those transactions have already been captured and transferred to the sink entity through export/import. In this case, for the capture process, an initial start's behavior in discarding inflight transactions would be the same as a restart's behavior, as will be further explained.

Mode Switching

In a different situation, a capture process (108) and an apply process (112) may already be operating to convey interesting data change records from the source entity (104) to the sink entity (106). However, both processes may still be operating in a checkpoint mode. This is so because, for example, one or both of the capture process and the apply process may be of a prior version of software release that does not support the checkpoint free operation.

In some embodiments, the capture process and the apply process (or rather their respective software modules) may be independently or asynchronously upgraded with respect to each other. Furthermore, in these embodiments, a later released process, be it the capture process or the apply process, is able to detect a software version of its counterpart and acts accordingly. Thus, if the counterpart can only operate the checkpoint mode, the later released process will operate that mode. However, if the counterpart can operate the checkpoint free mode, the later released process will cooperate with the counterpart and transition to the checkpoint free mode, even if the current operating mode is not so.

Look-Back

In some embodiments, the checkpoint-free log mining mechanism comprising the capture process at the source entity and the apply process at the sink entity may switch log mining and information sharing between the two entities from the checkpoint mode to the checkpoint free mode by employing a look-back approach. Referring to both FIG. 3E and FIG. 4E, under this look-back approach, in block 482 of FIG. 4E, at a particular time when operating in a checkpoint mode, the capture process (108) receives an indication to operate in a checkpoint-free mode. This is perhaps because either the capture process itself or the apply process has just been upgraded and thus new ability to operate in the checkpoint free mode is discovered. In an embodiment, this indication to switch mode may be in the form of a request that is received by the capture process.

The phrase "a particular time" refers to another exception case to the usual meaning of "a time in the redo logs" in this description; here the term "(receiving at) a particular time" refers to the time when the capture process (108) actually receives such an indication for mode switching.

Figure 4E:
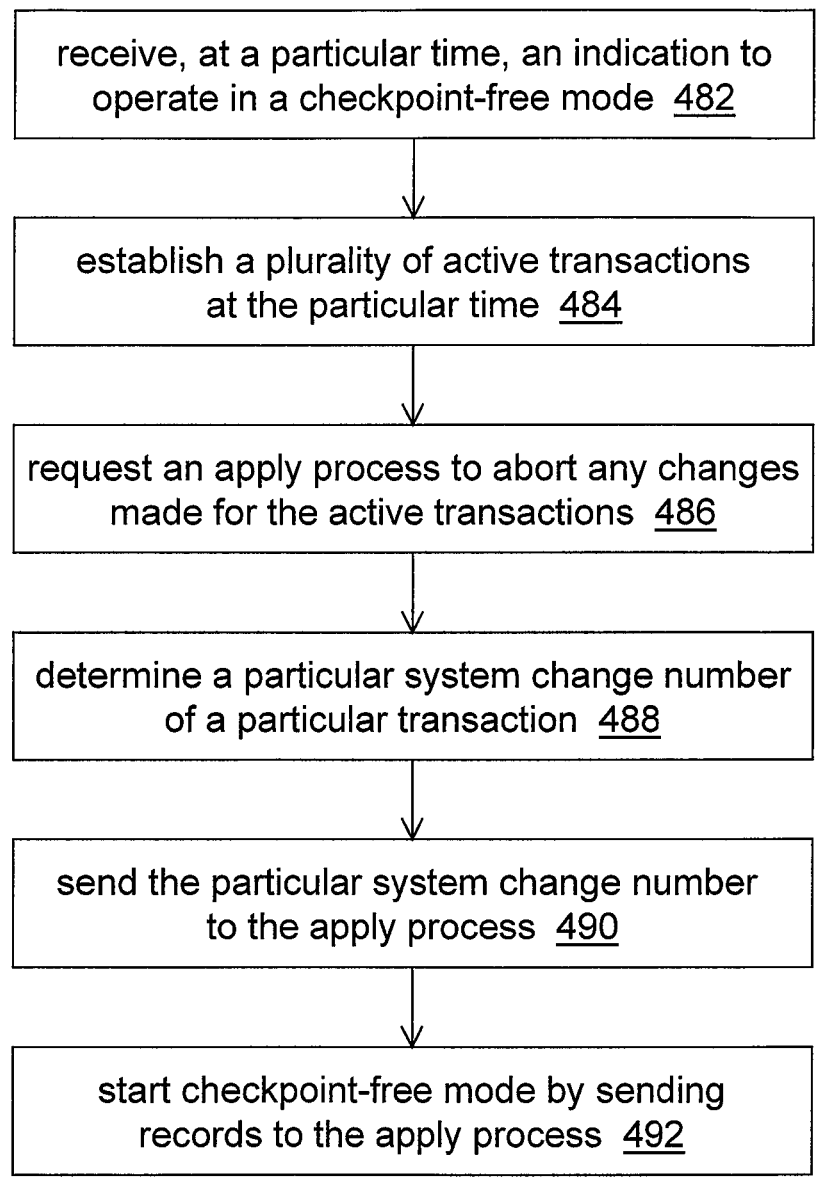

In the present example as illustrated in FIG. 3E, the capture process (108) receives an indication to switch mode at a Time 16 (212-16 of FIG. 3E) in block 482 of FIG. 4E.

Upon receiving the indication, in block 484 of FIG. 4E, the capture process (108) establishes a plurality of active transactions at the particular time. In the present example, the plurality of active transactions established in this step comprises T27 (202-27 of FIG. 3E) and T29 (202-29 of FIG. 3E).

To establish the plurality of active transactions at the particular time, the capture process (108) may query the transaction history maintained by the database system (100). As before, each of the plurality of active transaction has a start transaction record that has been assigned a system change number. The capture process determines a set of system change numbers that comprises all system change numbers of all start transactions records of the plurality of active transactions at the particular time.

Subsequently, in block 486 of FIG. 4E, the capture process request the apply process at the sink entity to stop making any new data changes and abort any other data changes that have been made for the plurality of active transactions. Thus, in the present example, the apply process is requested not to make any new data changes and abort any other data changes that have been made for T27 and T29, even though these two transactions comprise interesting redo records such as 302-18 and 302-19 (in FIG. 3E).

In some embodiments, until explicitly re-enabled by the capture process, the apply process (112) also stops make any other subsequent changes. Thus, in these embodiments, redo records associated with a T30 (202-30) are also not consumed by the apply process, even if the redo records for T30 are sent to the apply process, and even though the redo records comprise an interesting redo record (302-20).

In block 488 of FIG. 4E, the capture process (108) determines a particular system change number that is assigned to a particular start transaction record of a particular transaction. Here, the particular transaction has the smallest system change number in its start transaction record among all the inflight transactions at the particular time. In the present example, the particular transaction determined in this step will be T27 (202-27 of FIG. 3E).

Once the particular system change number is determined, in block 490 of FIG. 4E, the capture process sends the particular system change number to the apply process. The apply process receives this system change number and establishes it as the lowest value for all subsequent system change numbers. In the present example, the apply process will receive the system change number of the start transaction record of T27 and establish it as the particular SCN that all subsequent system change numbers are to exceed.

Once the particular system change number is communicated and established by the capture process and the apply process, the capture process, along with the apply process, may start to operate in the checkpoint-free mode by sending one or more records in block 492 of FIG. 4E. Here, each of the one or more records is associated with a transaction (for example, T27 202-27 with an interesting redo record 302-18, T29 with an interesting redo record 302-19, or T30 with an interesting redo record 302-20) that is no earlier than the start transaction record of the particular transaction such as T27 in the present example. In one embodiment, each such (subsequent) transaction either comprises or brackets an interesting redo record.

In an embodiment, the step of determining a particular system change number of a particular start transaction record of a particular transaction comprises determining, from one or more redo logs, when each of start transaction operations of the plurality of active transactions occurs. In an alternative embodiment, the step of determining a particular system change number of a particular start transaction record of a particular transaction comprises determining, from one or more checkpoint logs, when each of start transaction operations of the plurality of active transactions occurs. These checkpoint logs are created by checkpoints taken in the previous checkpoint mode. In yet another alternative embodiment, when each of the plurality of active transactions starts may be determined from both the redo logs and checkpoint logs or any other log mining technologies, if necessary.

Look-Forward

Figure 3F:
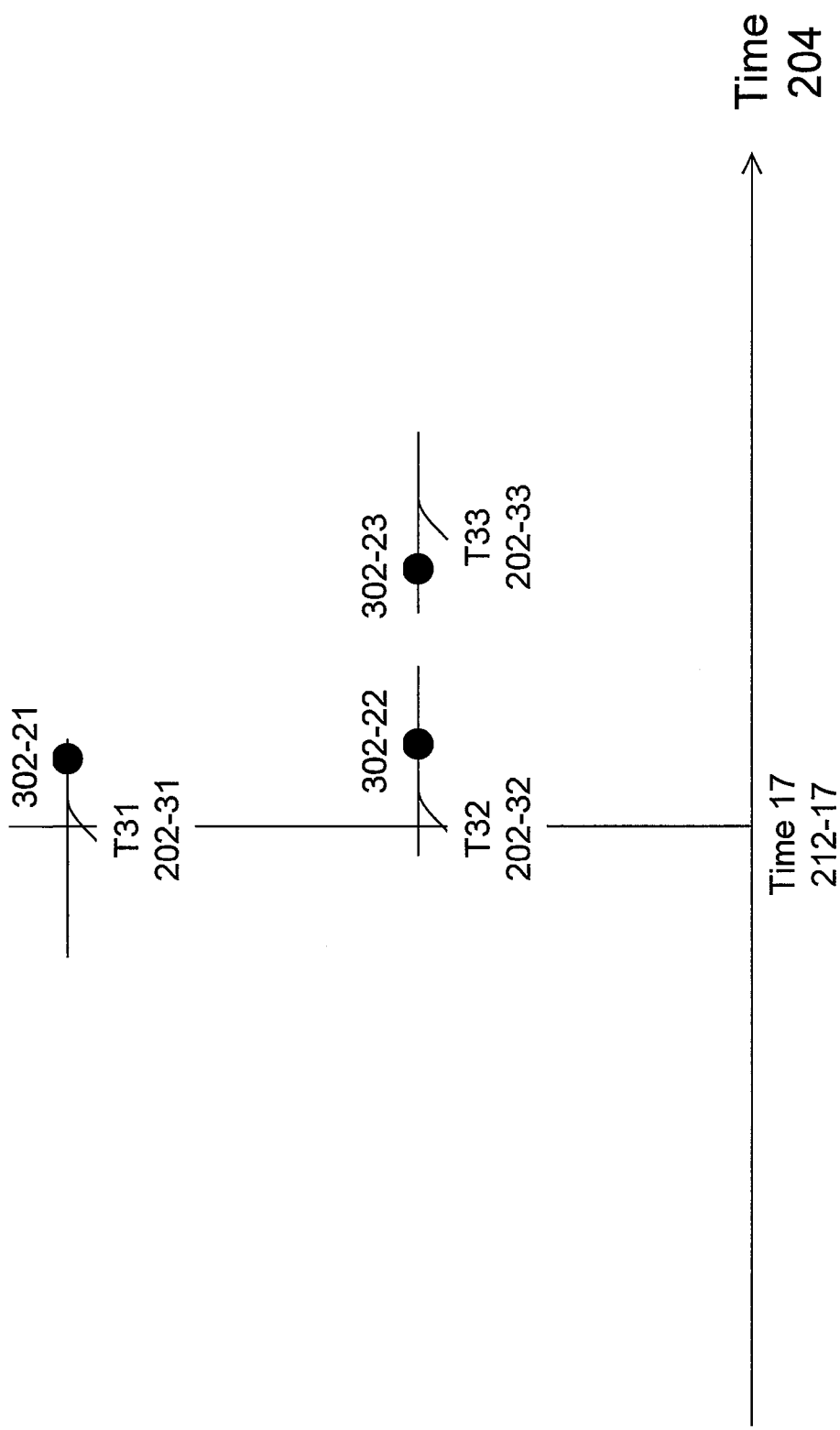
Figure 4F:
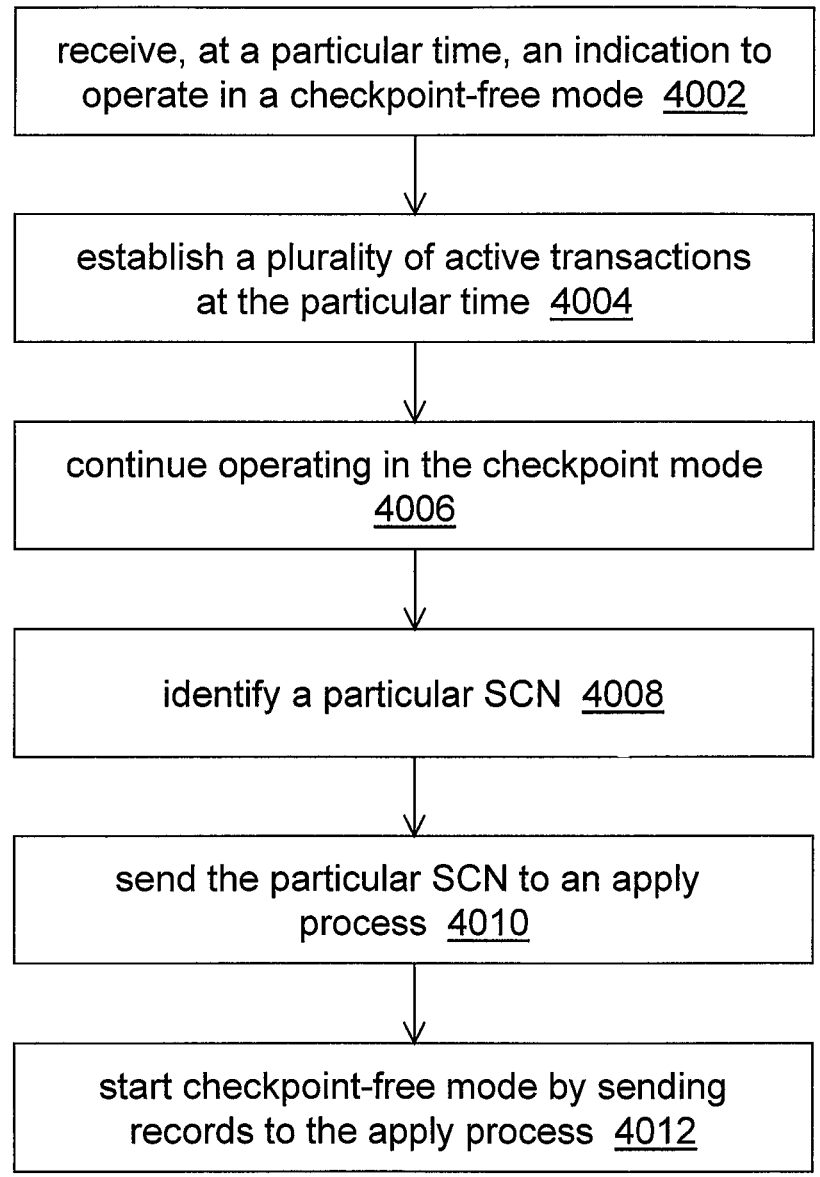

In some embodiments, the checkpoint-free log mining mechanism comprising the capture process at the source entity and the apply process at the sink entity may switch log mining and information sharing between the two entities from the checkpoint mode to the checkpoint free mode by employing a look-forward approach. Referring to FIG. 3F and FIG. 4F, under this look-forward approach, in block 4002 of FIG. 4F, at a particular time when operating in a checkpoint mode, the capture process (108) receives an indication to operate in a checkpoint-free mode. This is perhaps because either the capture process itself or the apply process has just been upgraded and thus new ability to operate in the checkpoint free mode is discovered. In an embodiment, this indication to switch mode may be in the form of a request that is received by the capture process.

The phrase "a particular time" also refers to an exception case to the usual meaning of "a time in the redo logs" in this description; here the term "(receiving at) a particular time" refers to the time when the capture process (108) actually receives such an indication for mode switching.

In the present example as illustrated in FIG. 3F, the capture process (108) receives an indication to switch mode at a Time 17 (212-17 of FIG. 3F) in block 4002 of FIG. 4F.

Upon receiving the indication, in block 4004 of FIG. 4F, the capture process (108) establishes a plurality of active transactions at the particular time. In the present example, the plurality of active transactions established in this step comprises T31 (202-31 with an interesting redo record 302-21 of FIG. 3F) and T32 (202-32 with an interesting redo record 302-22 of FIG. 3F).

In block 4006 of FIG. 4F, the capture process (108) continues operating in the checkpoint mode until all redo records related to all transactions that are no later than the particular active transaction have been consumed (and acknowledged) by an apply process. Thus, in the present example, the capture process continues to forward redo records related to T31 and T32, until the plurality of active transactions complete (at the end of T32 in FIG. 3F) and acknowledged by the apply process.

The capture process (108) identifies a system change number of an end transaction record of the last completed transaction in the plurality of active transacts as a maximum active system change number (MAX_ACTIVE_SCN). In the present example, the particular active transaction in the plurality of active transactions will be T32 (202-32 of FIG. 3F), since T32 is the latter of the two transactions in the plurality of transactions to have completed and thus has an end transaction record that is assigned the higher of a system change number of end transaction records of the two transactions.

Once the apply process consumes redo records and its oldest SCN (i.e., the lower limit for system change numbers of all subsequent redo records) passes MAX_ACTIVE_SCN (that is assigned to the end transaction record of the last completed transaction in the plurality of active transactions, as previously described), the capture process may be informed of this fact through an acknowledgment from the apply process in the checkpoint mode. Consequently, in block 4008, the capture process identifies a particular SCN that is first issued at or following the particular time (Time 17 in this example). In block 4010, the capture process sends the particular SCN to the apply process, which may make the particular SCN persistent, as its new oldest SCN. At this point, in block 4012, both the capture and apply processes may switch to (or start to operate in) the checkpoint-free mode. For example, in an embodiment, the capture process may request the apply process to do so. In another embodiment, both processes enter into the checkpoint-free mode automatically after the apply process acknowledges the receipt of the message containing the particular SCN for the checkpoint-free mode. In these two embodiments, both the capture and apply processes may support either the checkpoint mode or the checkpoint-free mode once initialized, may switch between the mode and go back to a different system change number (such as the particular SCN here) to re-mine in runtime, thereby making the restarting of the processes unnecessary. However, in yet another embodiment, both the capture and apply processes may be stopped. When the processes are restarted, they will start from the particular SCN that has been established in their prior session. In this embodiment, the apply process may supports either the checkpoint mode or the checkpoint-free mode once initialized and may not switch between the mode in runtime, thereby making the restarting of the processes necessary.

In some embodiments, the apply process has the duplicate suppression capability, i.e., if it has already applied a transaction, it will not reapply this transaction again. Thus, it is safe for the capture process to restart and re-mine from the particular SCN. Mining from the particular SCN ensures that the capture process will see the start transaction records of all transactions started after the particular SCN (which corresponds to Time 17) and be able to mine them in the checkpoint-free mode.

In an alternative embodiment, a database administrator may logon to the source entity at a particular time, say Time 17, take a note of the current SCN at Time 17, wait until all active transactions at Time 17 completes and get the SCN when all active transactions at Time 17 completes, say MAX_ACTIVE_SCN. In such an embodiment, the database administrator can make sure that the capture and apply processes are making progress and the oldest SCN of the apply process exceeds MAX_ACTIVE_SCN. After that, the database administrator can stop both the capture and apply processes. Update the oldest SCN in the apply process to the current SCN determine at Time 17. Thereafter, the capture and apply processes may be restarted in the checkpoint free mode.

In the foregoing discussion, the log mining has been described as being performed against the redo logs 110. It should be noted that this is for illustration purposes only. For the purpose of this description, the log mining may be performed against other types of logs. In addition, the logs that may be mined do not have to be in the form of a file or dataset in a hard disk, etc. For example, logs may be provided in the form of a stream from a process to the capture process. Such a stream may be a byte stream, record stream or message stream. For example, the logs may be provided to the capture process using an inter-process communication mechanism. Thus, these and other variations of logs to be mined using the mechanism as described herein are all within the scope of the present description.

In the foregoing discussion, the logical association has been described as between a capture process and an apply process in the checkpoint free log mining mechanism. It should be noted that this is for illustration purposes only. For the purpose of this description, a capture process may be logically associated with more than one apply processes in the checkpoint free log mining mechanism. Each apply process may maintain its individual particular SCN as a boundary for log mining. The capture process may provide log records that are individually interesting log records to any such apply process. Thus, these and other variations of associating a capture process with one or more apply processes are all within the scope of the present description.

For the purpose of illustration, the mining process, i.e., the capture process, has been described as located at the source entity. It should be noted that this is for illustration purposes only. For example, such a capture process can also run in another entity other than the source entity. In particular, an entity separate from the source entity and the sink entity may be designated as a mining entity. The redo logs in the source entity may be shipped to the mining entity. The capture process running at the mining entity may mine the redo logs received from the source entity and sends interesting changes to the sink entity. In addition, the sink entity may be the same as the mining entity. Thus, these and other variations of where the redo logs are mined are within the scope of this description.

For the purpose of illustration, each database change has been described as associated with a database operation, and each database operation has been described as associated with a data change record with an assigned system change number. It should be noted that this is for illustration purposes only. For the purpose of this description, other ways of association among database changes, database operations, data change records and system change numbers may be used. For example, the capture process may group multiple database changes (which may be caused by one or more data operations) into one data change record. For example, within such a data change record, the multiple database changes may be stored in a chained row or a linked list. The capture process may also break one large database change (for example, a change involving Large Object, or LOB) to multiple smaller data change records. The capture process may assign an overall system change number to the smaller data change records, but each of the smaller data change records may also be assigned to a subsequence number to differentiate amongst them. Thus, these and other variations of how database changes may be grouped into data change records are within the scope of this description.

For the purpose of illustration, it has been described that, when a redo record is consumed, the redo record is also applied to (the database system) at the sink entity. It should be noted that this is for illustration purpose only. For the purpose of this description, other meanings of the term "consumed" may also be appropriate in various embodiments. For example, it may mean that the apply process has moved the record from one memory structure to some other memory. Thus, these and other variations of what constitutes consuming a redo record may be within the scope of this description.

Hardware Overview

Figure 5:
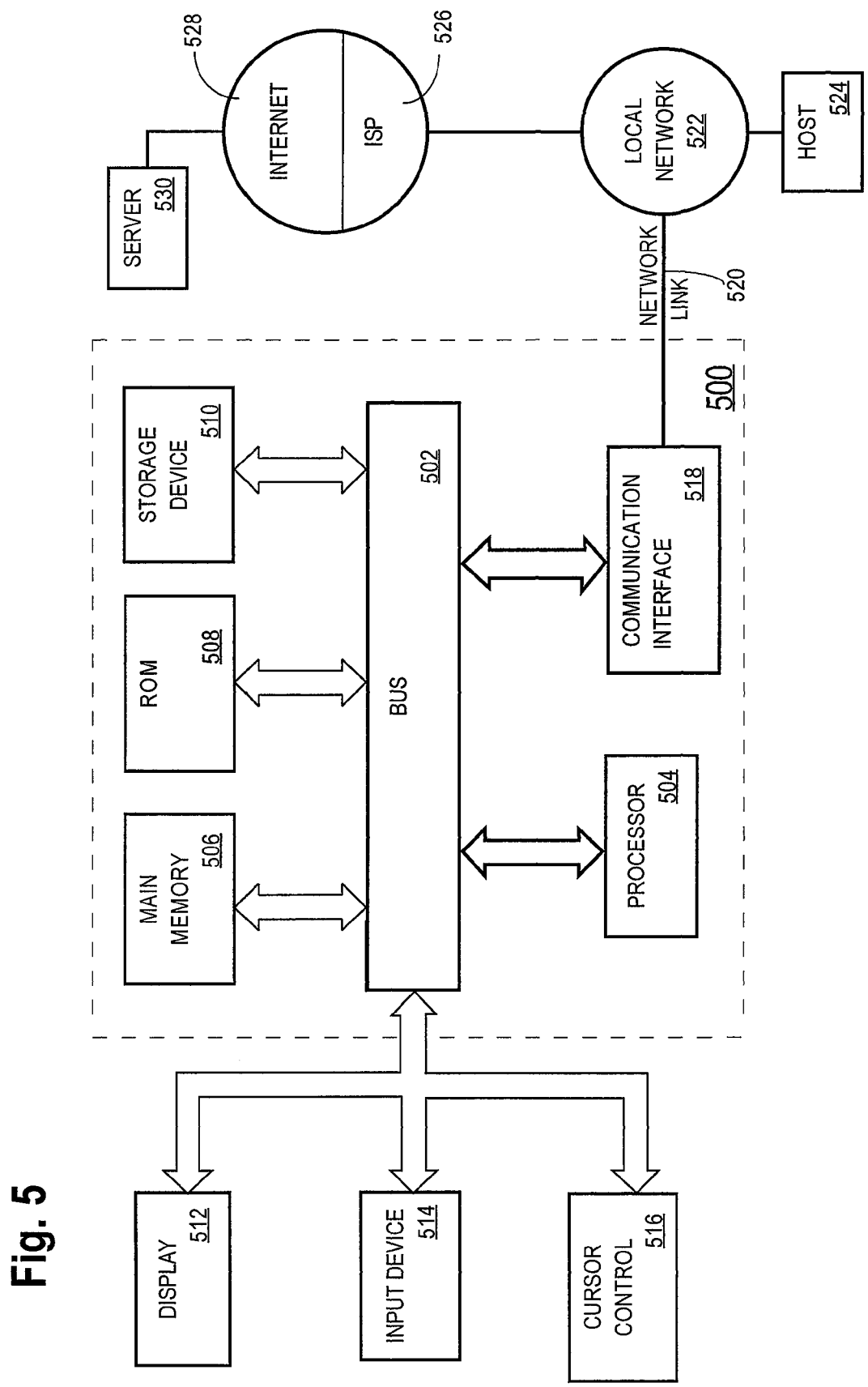
FIG. 5 is a block diagram of a system upon which the techniques described herein may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    on a source node, a capture process mining one or more transaction logs to generate logical change records at said source node;
    said capture process transmitting said logical change records to an apply process running on a destination node for said apply process to apply the logical change records at said destination node;
    wherein each logical change record of said logical change records is associated with a source logical time;
    wherein said apply process of said destination node maintains a particular source logical time representing a bounded safe time point in the one or more transaction logs to begin mining on said source node with respect to said apply process, wherein said particular source logical time is based on logical change records received by said apply process at said destination node;
    on said source node, a restarted capture process reestablishing an association with said apply process of said destination node;
    said source node receiving, from said destination node, the particular source logical time;
    in a checkpoint-free mode, said restarted capture process restarting mining of the one or more transaction logs based on said particular source logical time received from said destination node;
    wherein said restarting mining in the checkpoint-free mode does not require checkpoints taken by the capture process;
    wherein said method is performed by one or more computing devices.

2. The method of claim 1, further comprising said source node assigning system change numbers to source node transactions that are associated with said logical change records at said source node, and wherein said particular source logical time is one of said system change numbers.

3. The method of claim 1, further comprising said source node assigning system change numbers to said logical change records at said source node, and wherein said particular source logical time is one of said system change numbers.

4. The method of claim 1, wherein said capture process does not save any checkpoint information and wherein said restarted capture process does not retrieve any checkpoint information.

5. The A method of claim 1, further comprising said capture process preventing logical change records of inflight transactions at said source node at said logical time of said source node from being sent to said apply process.

6. The method of claim 1, wherein the particular source logical time comprises a source logical time associated with a last logical change record, of said logical change records, applied by said apply process at said destination node.

7. The method of claim 1, wherein said apply process maintains said particular source logical time by persisting said particular source logical time.

8. The method of claim 7, wherein said source node receives said particular source logical time from said destination node by accessing said particular source logical time persisted by said apply process.

9. The method of claim 1, wherein said capture process skips one or more records of said one or more transaction logs.

10. The method of claim 1, wherein the particular source logical time comprises a source logical time associated with an earliest start transaction record for a transaction, of said logical change records, received by said apply process at said destination node, wherein the transaction is not yet applied.

11. A non-transitory machine-readable storage medium carrying one or more sequences of instructions which, when executed by one or more processors, causes the one or more processors to perform:
    on a source node, a capture process mining one or more transaction logs to generate logical change records at said source node;
    said capture process transmitting said logical change records to an apply process running on a destination node for said apply process to apply the logical change records at said destination node;

wherein each logical change record of said logical change records is associated with a source logical time;

wherein said apply process of said destination node maintains a particular source logical time representing a bounded safe time point in the one or more transaction logs to begin mining on said source node with respect to said apply process, wherein said particular source logical time is based on logical change records received by said apply process at said destination node;

on said source node, a restarted capture process reestablishing an association with said apply process of said destination node;

said source node receiving, from said destination node, the particular source logical time;

in a checkpoint-free mode, said restarted capture process restarting mining of the one or more transaction logs based on said particular source logical time received from said destination node wherein said restarting mining in the checkpoint-free mode does not require checkpoints taken by the capture process.

12. The non-transitory machine-readable storage medium of claim 11, the one or more sequences of instructions which, when executed by the one or more processors, further causes said source node assigning system change numbers to source node transactions that are associated with said logical change records at said source node, and wherein said particular source logical time is one of said system change numbers.

13. The non-transitory machine-readable storage medium of claim 11, the one or more sequences of instructions which, when executed by the one or more processors, further causes said source node assigning system change numbers to said logical change records at said source node, and wherein said particular source logical time is one of said system change numbers.

14. The non-transitory machine-readable storage medium of claim 11, wherein said capture process does not save any checkpoint information and wherein said restarted capture process does not retrieve any checkpoint information.

15. The non-transitory machine-readable storage medium of claim 11, the one or more sequences of instructions which, when executed by the one or more processors, further causes said capture process preventing logical change records of inflight transactions at said source node at said logical time of said source node from being sent to said apply process.

16. The non-transitory machine-readable storage medium of claim 11, wherein the particular source logical time comprises a source logical time associated with a last logical change record, of said logical change records, applied by said apply process at said destination node.

17. The non-transitory machine-readable storage medium of claim 11, wherein said apply process maintains said particular source logical time by persisting the particular source logical time.

18. The non-transitory machine-readable storage medium of claim 17, wherein said source node receives said particular source logical time from said destination node by accessing the particular source logical time persisted by said apply process.

19. The non-transitory machine-readable storage medium of claim 11, wherein said capture process skips one or more records of the one or more transaction logs.

20. The non-transitory machine-readable storage medium of claim 11, wherein the particular source logical time comprises a source logical time associated with an earliest start transaction record for a transaction, of said logical change records, received by said apply process at said destination node, wherein the transaction is not yet applied.

* * * * *

UNITED STATES PATENT AND TRADEMARK OFFICE
CERTIFICATE OF CORRECTION

PATENT NO. : 9,009,104 B2
APPLICATION NO. : 12/853991
DATED : April 14, 2015
INVENTOR(S) : Lik Wong et al.

It is certified that error appears in the above-identified patent and that said Letters Patent is hereby corrected as shown below:

Specification

Column 3, Line 49, delete "of received by apply, but apply" and insert --received by the apply process, but the apply process--

Column 13, Line 16, delete "in block 448 of FIG. 3C," and insert --in block 450 of FIG. 4C,--

Signed and Sealed this
Twelfth Day of April, 2016

Michelle K. Lee
*Director of the United States Patent and Trademark Office*